US012581337B2

(12) United States Patent
Lee et al.

(10) Patent No.: US 12,581,337 B2
(45) Date of Patent: Mar. 17, 2026

(54) METHOD AND APPARATUS FOR TRANSMITTING INFORMATION ABOUT CHANNEL STATE IN NR V2X

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 751 days.

(21) Appl. No.: 17/755,173

(22) PCT Filed: Oct. 22, 2020

(86) PCT No.: PCT/KR2020/014492

§ 371 (c)(1),
(2) Date: Apr. 22, 2022

(87) PCT Pub. No.: WO2021/080347

PCT Pub. Date: Apr. 29, 2021

(65) Prior Publication Data

US 2022/0369144 A1     Nov. 17, 2022

Related U.S. Application Data

(60) Provisional application No. 62/943,785, filed on Dec. 4, 2019, provisional application No. 62/924,688, filed on Oct. 22, 2019.

(51) Int. Cl.
*H04W 24/10*     (2009.01)
*H04W 4/40*      (2018.01)
*H04W 92/18*     (2009.01)

(52) U.S. Cl.
CPC .............. *H04W 24/10* (2013.01); *H04W 4/40* (2018.02); *H04W 92/18* (2013.01)

(58) Field of Classification Search
CPC ....... H04W 24/10; H04W 4/40; H04W 92/18; H04W 72/02; H04W 72/25; H04W 72/56;
(Continued)

(56) References Cited

U.S. PATENT DOCUMENTS

2019/0268059 A1* 8/2019 Yang ...................... H04L 1/1812
2021/0067303 A1* 3/2021 Boroujeni et al. .... H04L 1/1893
(Continued)

FOREIGN PATENT DOCUMENTS

CN        107211430        9/2017
CN        107734655        2/2018
(Continued)

OTHER PUBLICATIONS

European Patent Office Application Serial No. 20878793.7, Office Action dated Jul. 2, 2024, 9 pages.
(Continued)

*Primary Examiner* — Yu-Wen Chang
(74) *Attorney, Agent, or Firm* — LEE, HONG, DEGERMAN, KANG & WAIMEY

(57)     ABSTRACT

Proposed is a method for performing, by a first apparatus, wireless communication. The method may comprise the steps of: receiving, from a second apparatus, information about latency bound related to sidelink channel state information; selecting a resource to transmit the sidelink channel state information in a selection window, on the basis that a reserved resource does not exist in a time window for reporting the sidelink channel state information; and transmitting, to the second apparatus, an MAC CE including the sidelink channel state information in the time window through the selected resource. For example, the time window may be determined on the basis of the latency bound. For example, the selection window may be determined on the basis of at least one of the time window, a time offset (Continued)

value, or a requirement related to the sidelink channel state information.

17 Claims, 24 Drawing Sheets

(58) Field of Classification Search
CPC . H04W 72/40; H04W 76/14; H04W 72/0446; H04B 7/0626; H04L 1/0027; H04L 1/1858
See application file for complete search history.

(56) References Cited

U.S. PATENT DOCUMENTS

| | | | | |
|---|---|---|---|---|
| 2021/0105055 A1* | 4/2021 | Chae et al. | .......... | H04B 7/0626 |
| 2021/0219268 A1* | 7/2021 | Li et al. | ................ | H04W 72/02 |
| 2021/0368480 A1* | 11/2021 | Chen et al. | .......... | H04W 72/02 |
| 2022/0104183 A1* | 3/2022 | Huang | .................. | H04W 24/10 |
| 2022/0201528 A1* | 6/2022 | Shin et al. | .............. | H04L 5/005 |
| 2022/0279536 A1* | 9/2022 | Khsiba et al. | ........ | H04W 72/40 |
| 2022/0286184 A1* | 9/2022 | Li et al. | ............... | H04B 7/0695 |
| 2022/0287055 A1* | 9/2022 | Lee et al. | ............. | H04W 24/10 |

FOREIGN PATENT DOCUMENTS

| | | |
|---|---|---|
| CN | 109246659 | 1/2019 |
| CN | 109644455 | 4/2019 |
| EP | 3273634 | 1/2018 |
| KR | 2015-0083808 | 7/2015 |
| WO | 2017-197393 | 11/2017 |
| WO | 2018-031172 | 2/2018 |
| WO | 2018-201390 | 11/2018 |
| WO | 2018-218393 | 12/2018 |
| WO | 2019-033407 | 2/2019 |

OTHER PUBLICATIONS

The State Intellectual Property Office of the People's Republic of China Application Serial No. 202080086589.5, Office Action dated Aug. 22, 2024, 7 pages.

Intel Corporation, "Sidelink Resource Allocation Design for NR V2X Communication," R1-1904296, 3GPP TSG RAN WG1 Meeting #96bis, Apr. 2019, 15 pages.

PCT International Application No. PCT/KR2020/014492, International Search Report dated Jan. 26, 2021, 4 pages.

Huawei et al., "Sidelink CSI," R1-1909438, 3GPP TSG RAN WG1 Meeting #98, Aug. 2019, 11 pages.

3rd Generation Partnership Project, "Technical Specification Group Radio Access Network; Overall description of Radio Access Network (RAN) aspects for Vehicle-to-everything (V2X) based on LTE and NR (Release 16)," 3GPP TR 37.985 V0.2.0, Oct. 2019, 29 pages.

Huawei et al., "Sidelink PHY structure and procedure for NR V2X," R1-1810138, 3GPP TSG RAN WG1 Meeting #94bis, Oct. 2018, 17 pages.

3rd Generation Partnership Project, "Technical Specification Group Radio Access Network; NR; Radio Resource Control (RRC) protocol specification (Release 15)," 3GPP TS 38.331 V15.7.0, Sep. 2019, 529 pages.

European Patent Office Application Serial No. 20878793.7, Search Report dated Oct. 21, 2022, 14 pages.

Lenovo et al., "Discussion on physical layer procedures for NR sidelink," R1-1910147, 3GPP TSG RAN WG1 #98bis, Oct. 2019, 8 pages.

Interdigital Inc., "Physical Layer Procedures for NR V2X Sidelink," R1-1911280, 3GPP TSG RAN WG1 #98bis, Oct. 2019, 14 pages.

The State Intellectual Property Office of the People's Republic of China Application Serial No. 202080086589.5, Office Action dated Mar. 26, 2024, 7 pages.

The State Intellectual Property Office of the People's Republic of China Application Serial No. 202080086589.5, Office Action dated Dec. 4, 2024, 4 pages.

Korean Intellectual Property Office Application No. 10-2022-7013632, Notice of Allowance dated May 8, 2025, 2 pages.

Spreadtrum Communications, "Discussion on NR sidelink Mode 2 resource allocation", R1-1910007, 3GPP TSG RAN WG1 #98bis, Oct. 2019, 5 pages.

Asia Pacific Telecom, "Discussion on sidelink resource allocation mode 2", R1-1908929, 3GPP TSG-RAN WG1 Meeting #98, Aug. 2019, 6 pages.

* cited by examiner (a)

Carrier Bandwidth $N_{BWP, 2}^{start}$ $N_{BWP, 1}^{start}$ $N_{BWP, 0}^{start}$ $N_{BWP, 2}^{size}$ $N_{BWP, 1}^{size}$ $N_{BWP, 0}^{size}$

Figure 7:
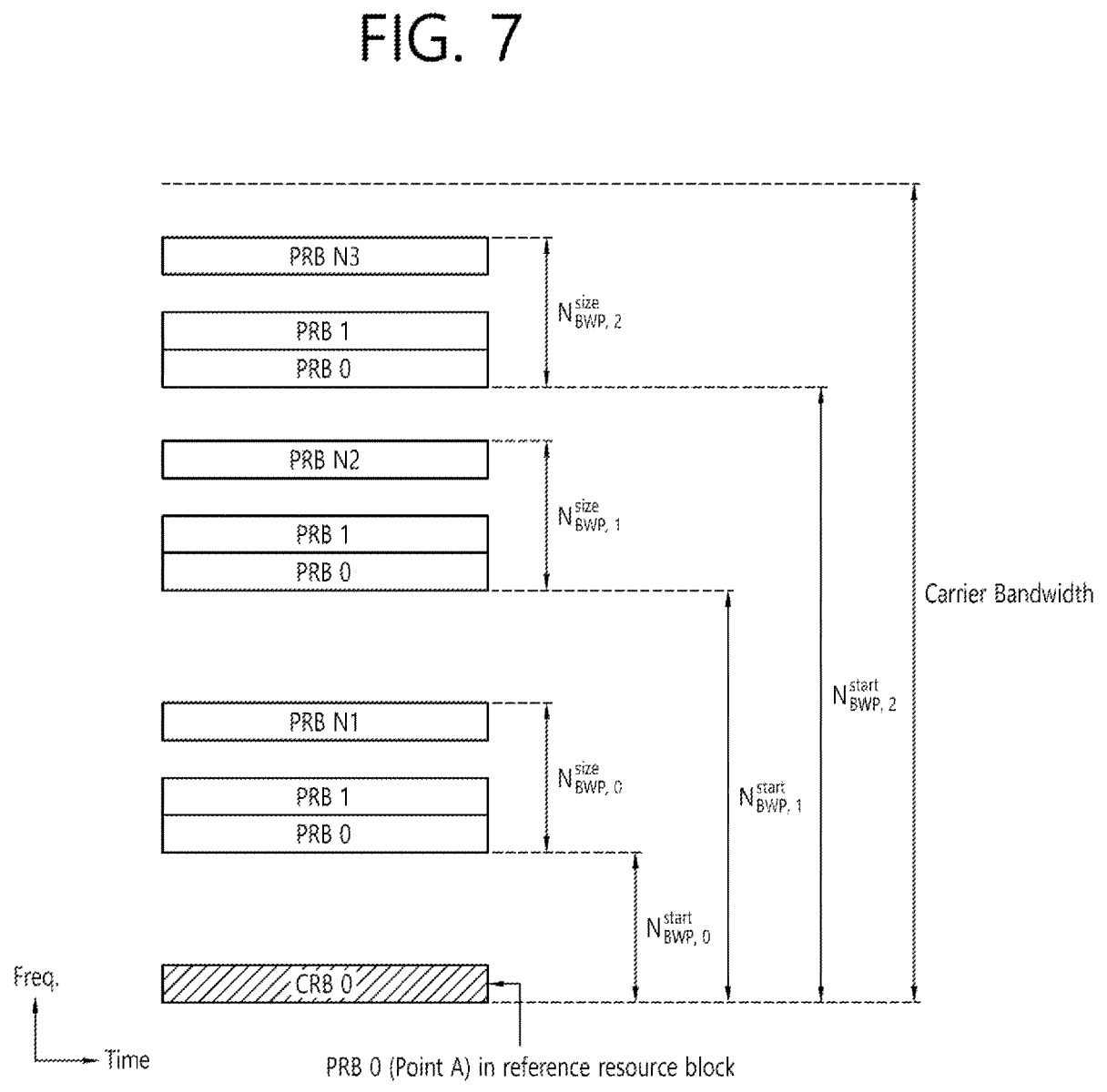

PRB N3

PRB 1

PRB 0

PRB N2

PRB 1

PRB 0

PRB N1

PRB 1

PRB 0

CRB 0

PRB 0 (Point A) in reference resource block

Time

Freq.

PC5-U (a)

PC5-C (b)

BS(e.g. eNB or gNB)

Figure 22:
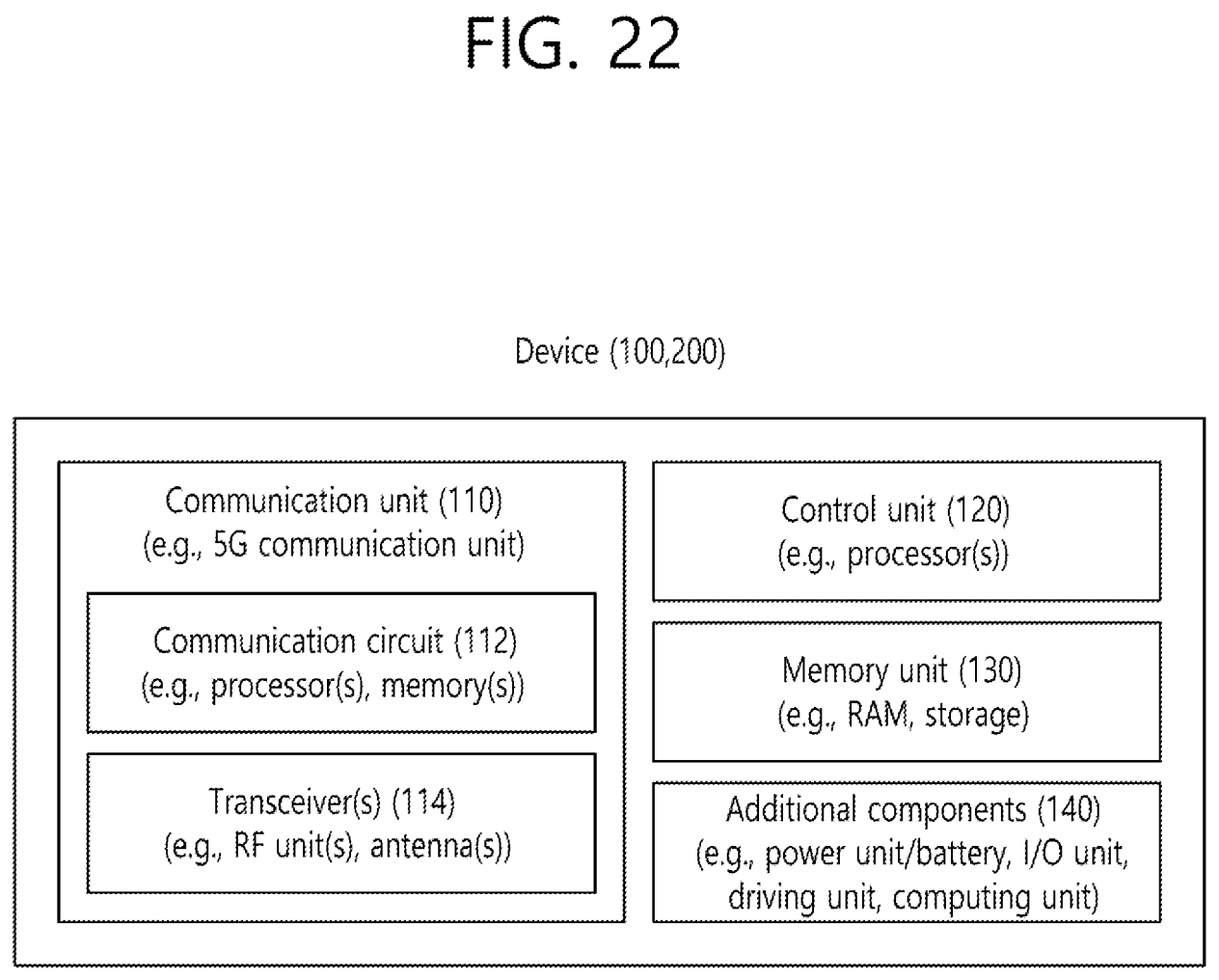

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

FIG. 24

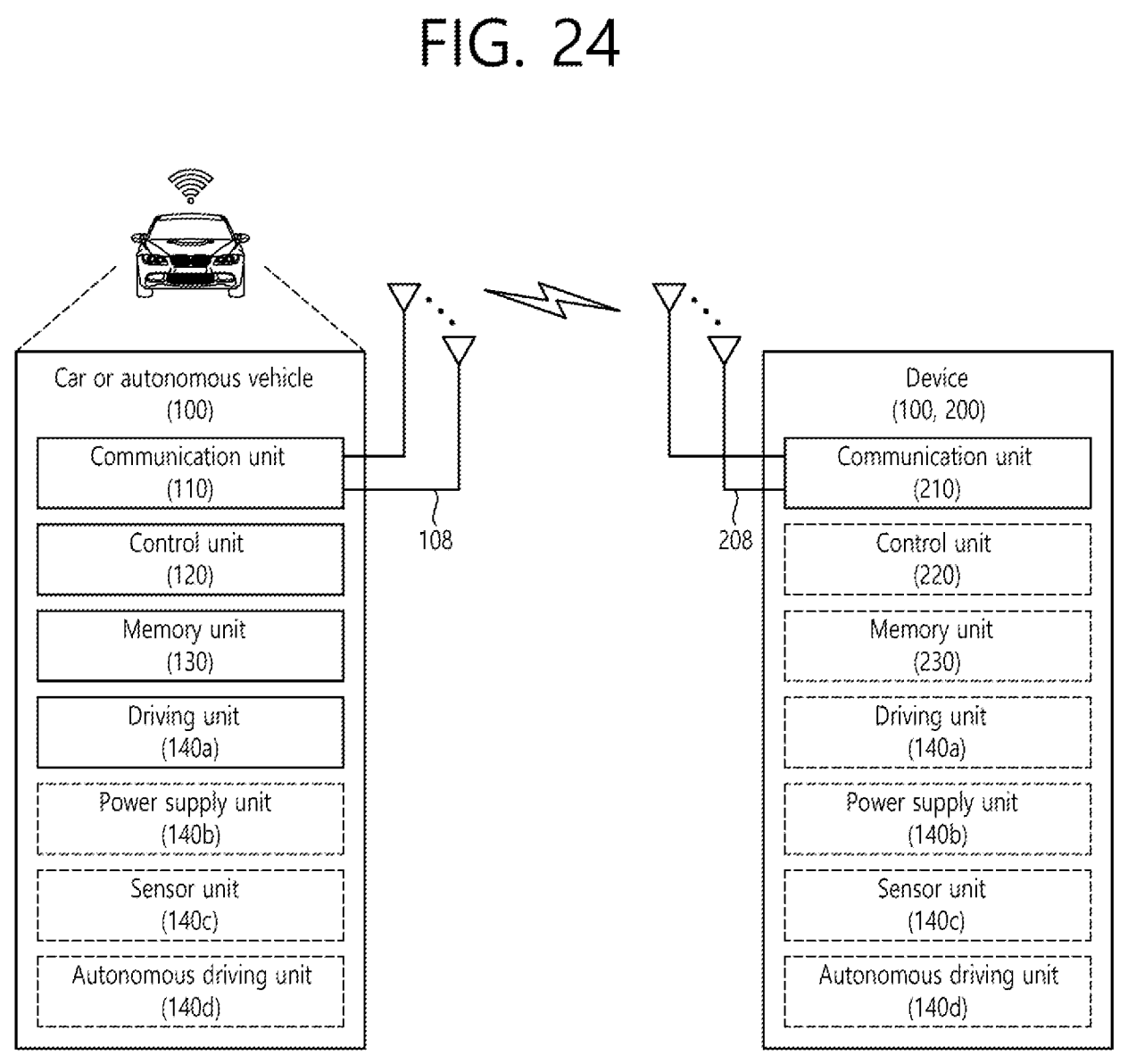

Device
(100, 200)

Communication unit (210)

Control unit (220)

Memory unit (230)

Driving unit (140a)

Power supply unit (140b)

Sensor unit (140c)

Autonomous driving unit (140d)

208

Car or autonomous vehicle (100)

Communication unit (110)

Control unit (120)

Memory unit (130)

Driving unit (140a)

Power supply unit (140b)

Sensor unit (140c)

Autonomous driving unit (140d)

108

METHOD AND APPARATUS FOR TRANSMITTING INFORMATION ABOUT CHANNEL STATE IN NR V2X

CROSS-REFERENCE TO RELATED APPLICATIONS

This application is the National Stage filing under 35 U.S.C. 371 of International Application No. PCT/KR2020/014492, filed on Oct. 22, 2020, which claims the benefit of U.S. Provisional Application No. 62/924,688, filed on Oct. 22, 2019, and 62/943,785, filed on Dec. 4, 2019, the contents of which are all hereby incorporated by reference herein in their entireties.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

In the meantime, in NR V2X, when sidelink channel state information/channel quality information is (mutually) is exchanged or reported between UEs performing sidelink communication (e.g., unicast), the UE(s) may adaptively adjust parameters related to transmission. For example, the parameters related to transmission may include transmission power, the number of retransmissions, the number of retransmissions related to a specific transport block, the size of time/frequency resource(s), an effective coding rate, an MCS value, and the like. For example, when sidelink channel state information/channel quality information is exchanged or reported between UEs performing sidelink communication, the UE(s) may adaptively control transmission-related parameters based on changes in sidelink channel state/sidelink channel quality. Through this, the UE can efficiently satisfy requirements related to the target service (e.g., reliability, latency, minimum required communication range, etc.).

In the meantime, the UE may need a clear criterion for determining a time point at which sidelink channel state information (SL CSI) reporting is completed and a selection window related to selecting a resource for SL CSI report/reporting.

In the meantime, the operation for selecting a resource in MODE 2 could be triggered only when SL data is available on a logical channel (LCH), but in the current NR V2X, the SL CSI information can be directly generated from the MAC entity in the form of MAC CE. Accordingly, a new condition triggering resource selection for transmitting the SL CSI report/reporting may need to be defined.

In the meantime, whether to enable/disable a hybrid automatic repeat request (HARQ) feedback request could be configured for each LCH, but in the current NR V2X, since the SL CSI information is directly generated in the form of a MAC CE in the MAC entity, a problem may occur in relation to setting whether to enable/disable a hybrid automatic repeat request (HARQ) feedback request.

In the meantime, in NR V2X, since SL CSI information is directly generated in the form of MAC CE in the MAC entity, a priority between SL CSI and SL data for LCP operation may need to be defined.

Technical Solutions

In an embodiment, a method for a first device to perform wireless communication is proposed. The method comprises receiving information related to a latency bound related to sidelink channel state information from a second device; selecting a resource for transmitting sidelink channel state information in a selection window, based on absence of a reserved resource within a time window for reporting the sidelink channel state information; and transmitting a Medium Access Control (MAC) Control Element (CE) including the sidelink channel state information to the second device within the time window through the selected resource. For example, the time window may be determined based on the latency bound. For example, the selection window mat be determined based on at least one of the time window, a time offset value, or a requirement related to the sidelink channel state information.

Effects of the Disclosure

The user equipment (UE) may efficiently perform SL communication.

BRIEF DESCRIPTION OF THE DRAWINGS

FIG. 7 shows an example of a BWP, based on an embodiment of the present disclosure.

FIG. 22 shows another example of a wireless device, based on an embodiment of the present disclosure.

FIG. 24 shows a vehicle or an autonomous vehicle, based on an embodiment of the present disclosure.

DESCRIPTION OF EXEMPLARY EMBODIMENTS

Figure 1:
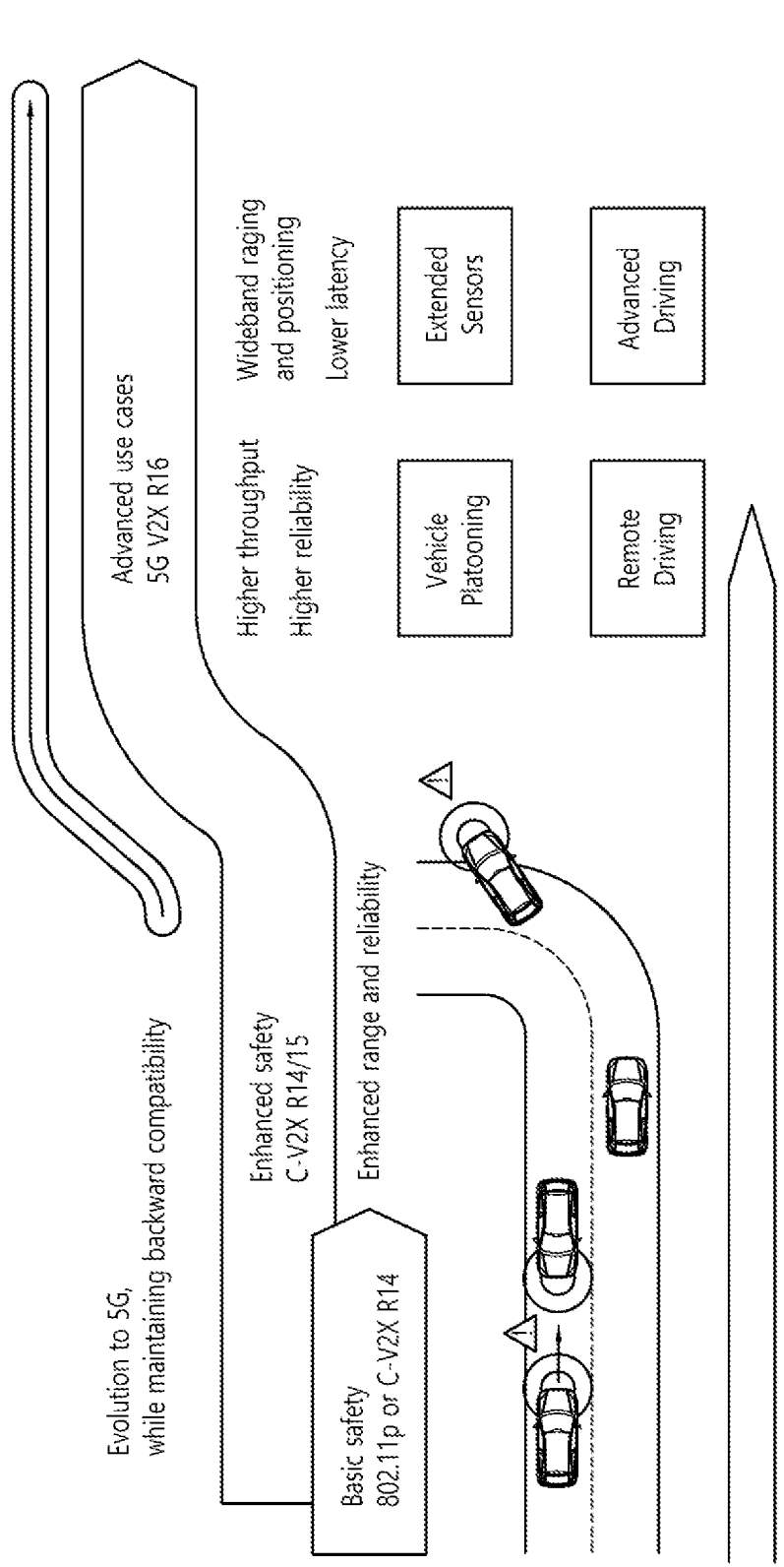
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet radio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
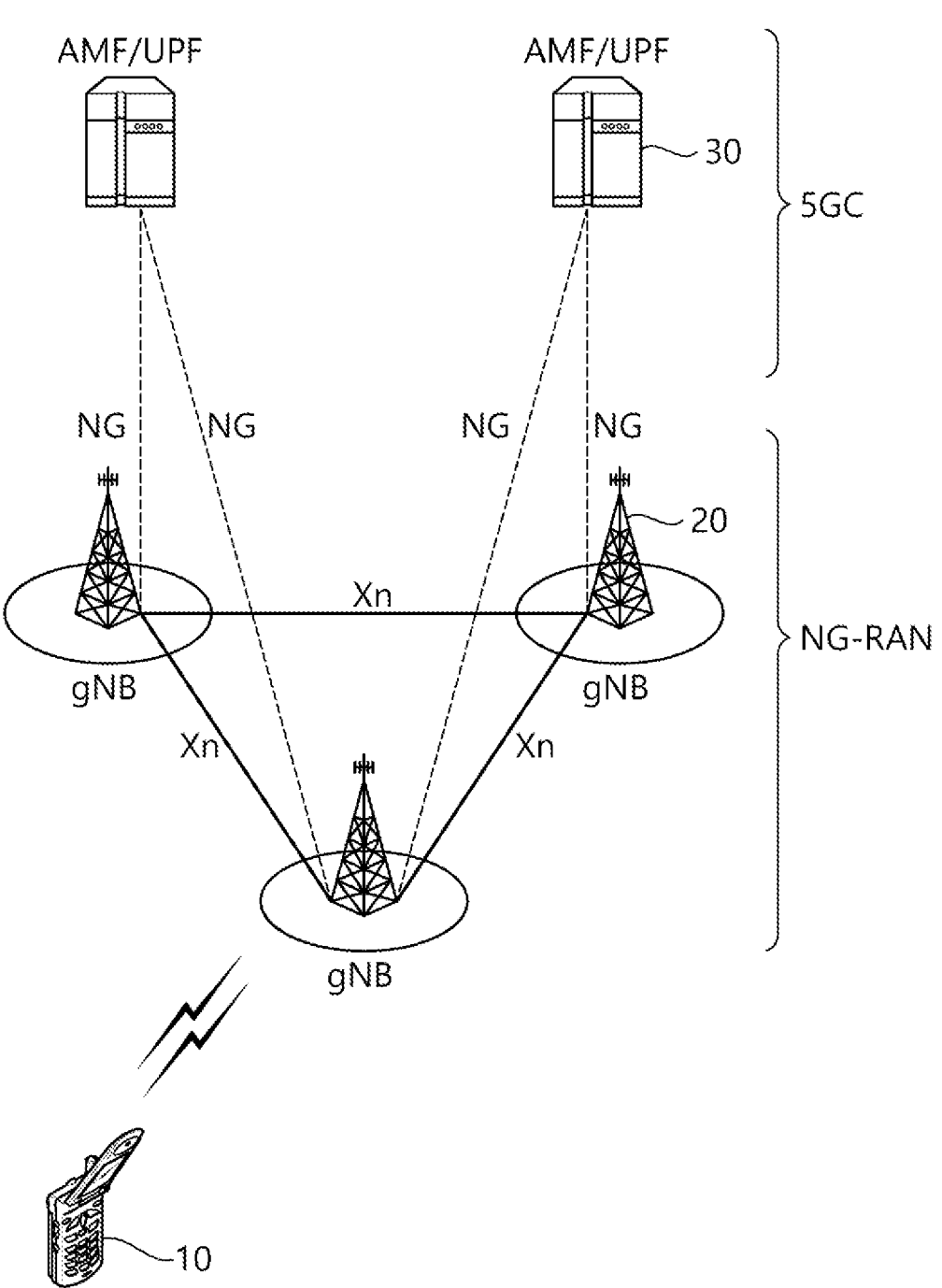
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
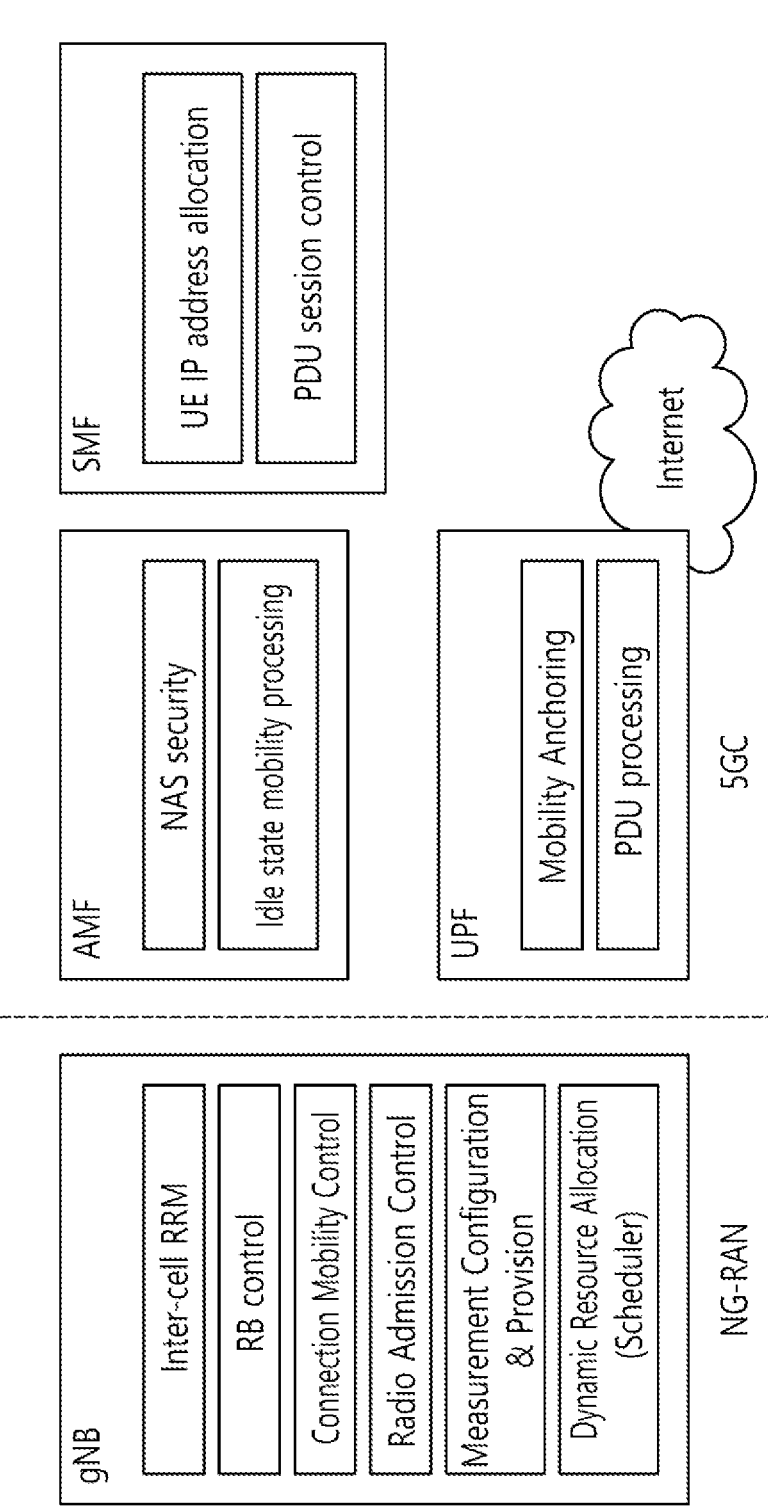
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4:
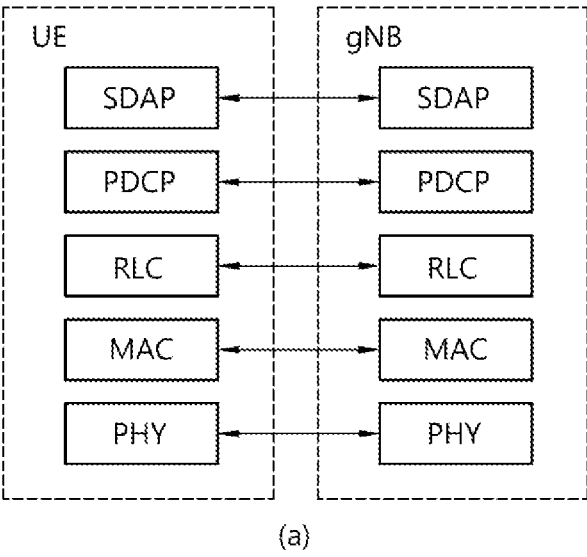
FIG. 4 shows a radio protocol architecture, based on an embodiment of the present disclosure.
Figure 4:
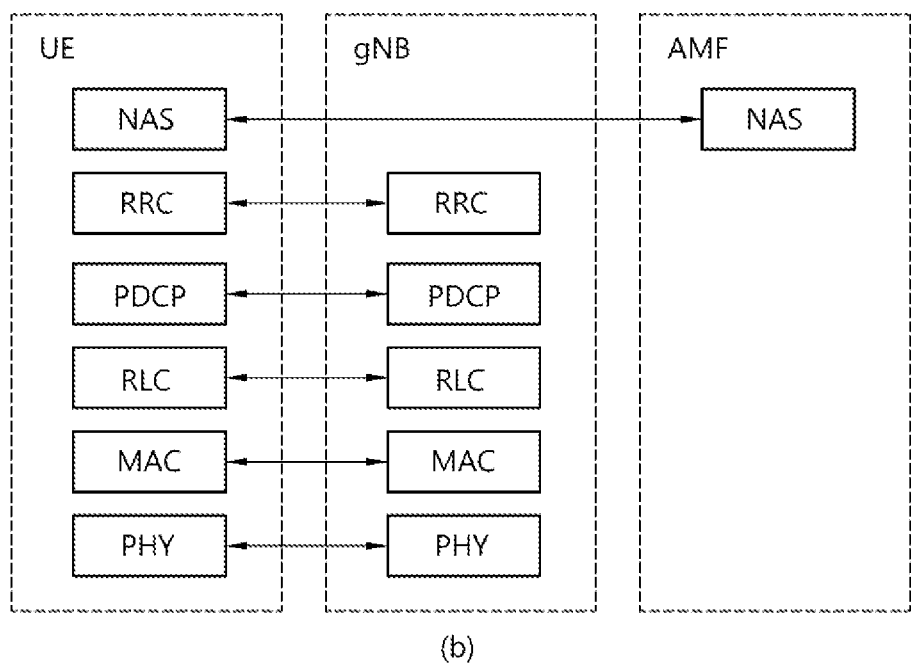

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
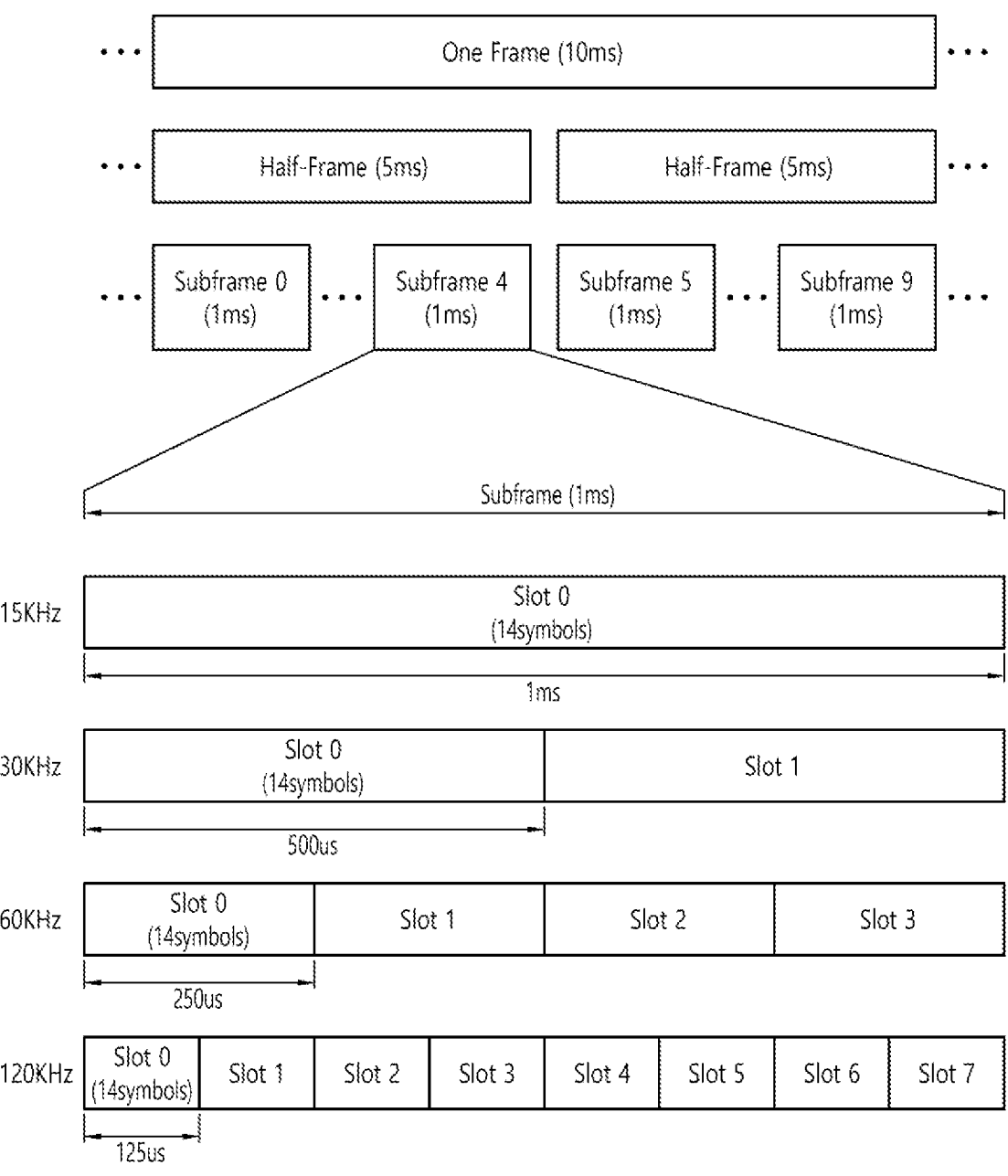
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15 * $2^u$) | $N^{slot}_{symb}$ | $N^{frame,\,u}_{slot}$ | $N^{subframe,\,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * $2^u$) | $N^{slot}_{symb}$ | $N^{frame,\,u}_{slot}$ | $N^{subframe,\,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz–6000 MHz | 15, 30, 60 kHz |
| FR2 | 24250 MHz–52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz–7125 MHz | 15, 30, 60 kHz |
| FR2 | 24250 MHz–52600 MHz | 60, 120, 240 kHz |

Figure 6:
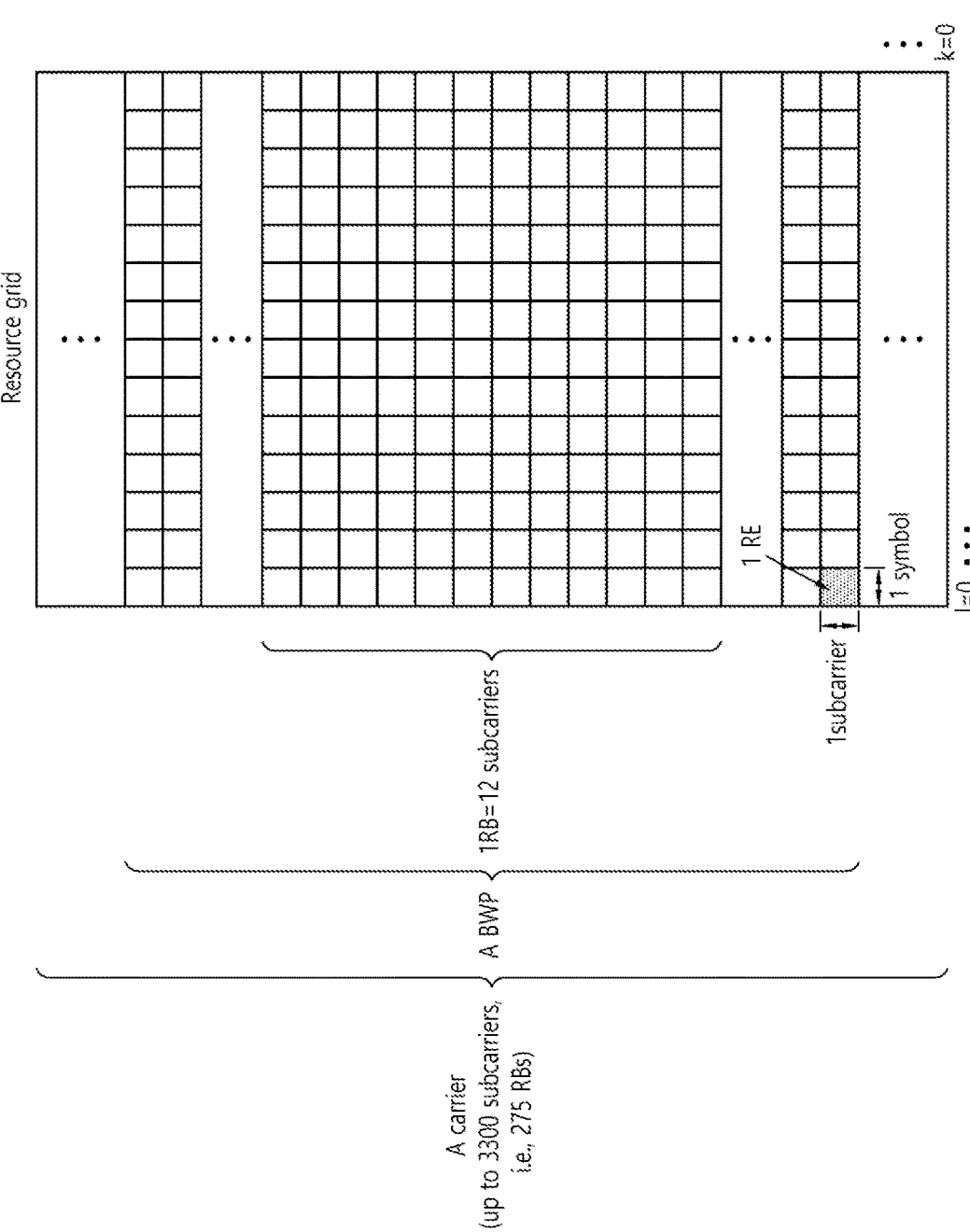
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8:
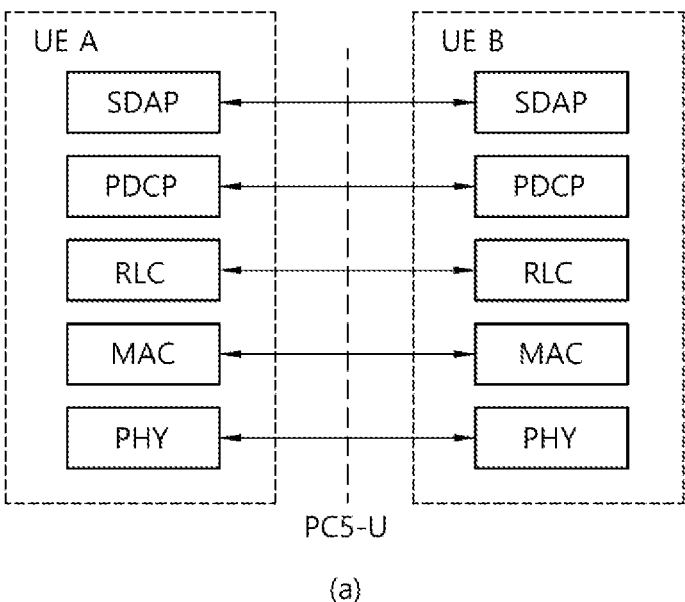
FIG. 8 shows a radio protocol architecture for a SL communication, based on an embodiment of the present disclosure.
Figure 8:
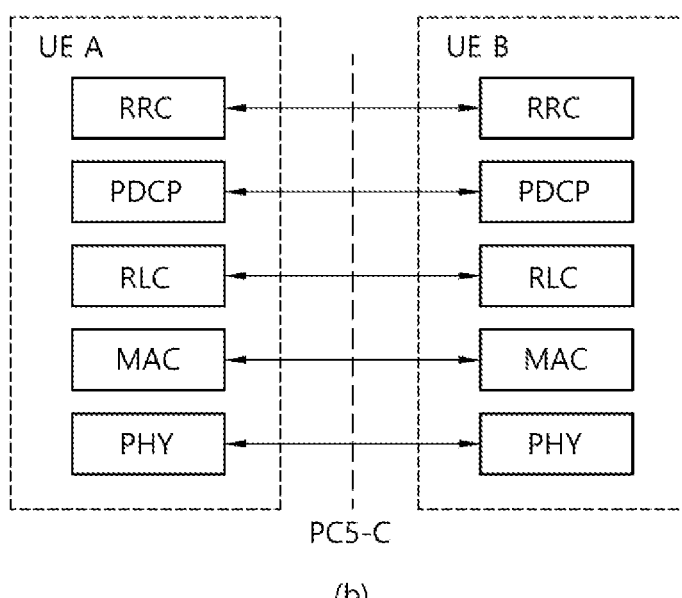

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
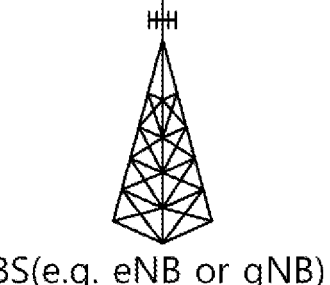
FIG. 9 shows a UE performing V2X or SL communication, based on an embodiment of the present disclosure.
Figure 9:
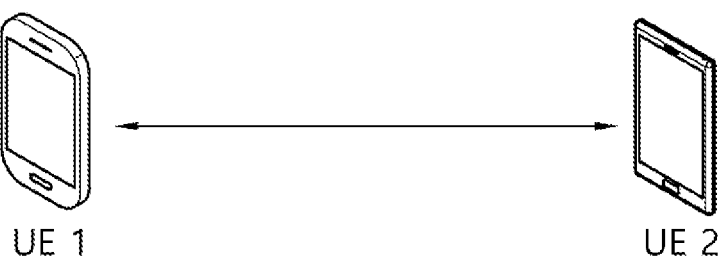

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit a SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
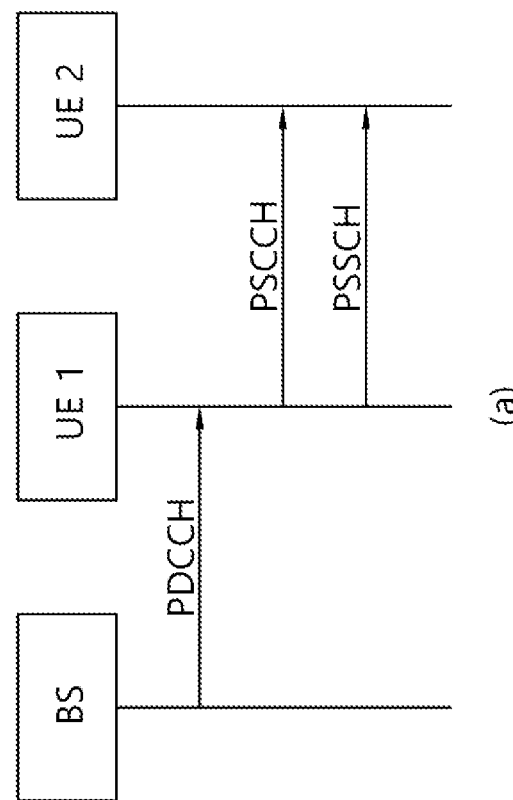
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(*b*) shows a UE operation related to an LTE transmission mode 2 or an LTE transmission mode 4. Alternatively, for example, FIG. 10(*b*) shows a UE operation related to an NR resource allocation mode 2.

Referring to FIG. 10(*a*), in the LTE transmission mode 1, the LTE transmission mode 3, or the NR resource allocation mode 1, a BS may schedule a SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(*b*), in the LTE transmission mode 2, the LTE transmission mode 4, or the NR resource allocation mode 2, the UE may determine a SL transmission resource within a SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
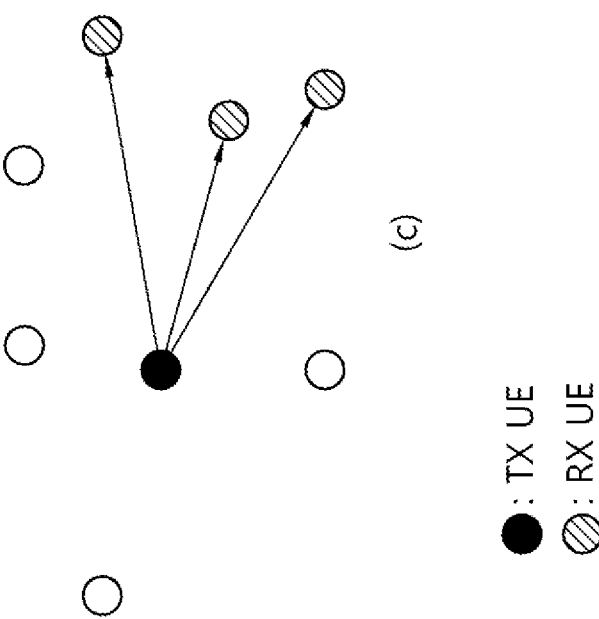
FIG. 11 shows three cast types, based on an embodiment of the present disclosure.
Figure 11:
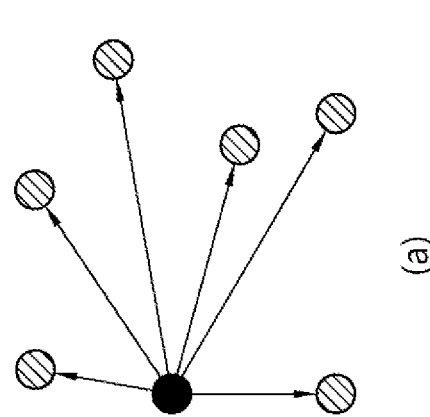

FIG. 11 shows three cast types, based on an embodiment of the present disclosure. The embodiment of FIG. 11 may be combined with various embodiments of the present disclosure. Specifically, FIG. 11(*a*) shows broadcast-type SL communication, FIG. 11(*b*) shows unicast type-SL communication, and FIG. 11(*c*) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in the present disclosure, for example, a transmitting UE (TX UE) may be a UE which transmits data to a (target) receiving UE (RX UE). For example, the TX UE may be a UE which performs PSCCH transmission and/or PSSCH transmission. Additionally/alternatively, for example, the TX UE may be a UE which transmits SL CSI-RS(s) and/or a SL CSI report request indicator to the (target) RX UE. Additionally/alternatively, for example, the TX UE may be a UE which transmits a (control) channel (e.g., PSCCH, PSSCH, etc.) and/or reference signal(s) on the (control) channel (e.g., DM-RS, CSI-RS, etc.), to be used for a SL radio link monitoring (RLM) operation and/or a SL radio link failure (RLF) operation of the (target) RX UE.

Meanwhile, in the present disclosure, for example, a receiving UE (RX UE) may be a UE which transmits SL HARQ feedback to a transmitting UE (TX UE) based on whether decoding of a data received from the TX UE is successful and/or whether detection/decoding of a PSCCH (related to PSSCH scheduling) transmitted by the TX UE is successful. Additionally/alternatively, for example, the RX UE may be a UE which performs SL CSI transmission to the TX UE based on SL CSI-RS(s) and/or a SL CSI report request indicator received from the TX UE. Additionally/alternatively, for example, the RX UE is a UE which transmits a SL (L1) reference signal received power (RSRP) measurement value, to the TX UE, measured based on (pre-defined) reference signal(s) and/or a SL (L1) RSRP report request indicator received from the TX UE. Additionally/alternatively, for example, the RX UE may be a UE which transmits data of the RX UE to the TX UE. Additionally/alternatively, for example, the RX UE may be a UE which performs a SL RLM operation and/or a SL RLF operation based on a (pre-configured) (control) channel and/or reference signal(s) on the (control) channel received from the TX UE.

Meanwhile, in the present disclosure, for example, in case the RX UE transmits SL HARQ feedback information for a PSSCH and/or a PSCCH received from the TX UE, the following options or some of the following options may be considered. Herein, for example, the following options or some of the following options may be limitedly applied only if the RX UE successfully decodes/detects a PSCCH scheduling a PSSCH.

(1) groupcast option 1: no acknowledgement (NACK) information may be transmitted to the TX UE only if the RX UE fails to decode/receive the PSSCH received from the TX UE.

(2) groupcast option 2: If the RX UE succeeds in decoding/receiving the PSSCH received from the TX UE, ACK information may be transmitted to the TX UE, and if the RX UE fails to decode/receive the PSSCH, NACK information may be transmitted to the TX UE.

Meanwhile, in the present disclosure, for example, the TX UE may transmit the following information or some of the following information to the RX UE through SCI(s). Herein, for example, the TX UE may transmit some or all of the following information to the RX UE through a first SCI and/or a second SCI.

PSSCH (and/or PSCCH) related resource allocation information (e.g., the location/number of time/frequency resources, resource reservation information (e.g., period))

SL CSI report request indicator or SL (L1) reference signal received power (RSRP) (and/or SL (L1) reference signal received quality (RSRQ) and/or SL (L1) reference signal strength indicator (RSSI)) report request indicator SL CSI transmission indicator (or SL (L1) RSRP (and/or SL (L1) RSRQ and/or SL (L1) RSSI) information transmission indicator) (on a PSSCH)

Modulation and Coding Scheme (MCS) information

TX power information

L1 destination ID information and/or L1 source ID information

SL HARQ process ID information

New Data Indicator (NDI) information

Redundancy Version (RV) information (Transmission traffic/packet related) QoS information (e.g., priority information)

SL CSI-RS transmission indicator or information on the number of antenna ports for (transmitting) SL CSI-RS TX UE location information or location (or distance range) information of the target RX UE (for which SL HARQ feedback is requested)

Reference signal (e.g., DM-RS, etc.) information related to decoding (and/or channel estimation) of data transmitted through a PSSCH. For example, information related to a pattern of (time-frequency) mapping resources of DM-RS(s), RANK information, antenna port index information, information on the number of antenna ports, etc.

Meanwhile, in the present disclosure, for example, since the TX UE may transmit a SCI, a first SCI and/or a second SCI to the RX UE through a PSCCH, the PSCCH may be replaced/substituted with the SCI and/or the first SCI and/or the second SCI. Additionally/alternatively, the SCI may be replaced/substituted with the PSCCH and/or the first SCI and/or the second SCI. Additionally/alternatively, for example, since the TX UE may transmit a second SCI to the RX UE through a PSSCH, the PSSCH may be replaced/substituted with the second SCI.

Meanwhile, in the present disclosure, for example, if SCI configuration fields are divided into two groups in consideration of a (relatively) high SCI payload size, the first SCI including a first SCI configuration field group may be referred to as a $1^{st}$ SCI, and the second SCI including a second SCI configuration field group may be referred to as a $2^{nd}$ SCI. Also, for example, the $1^{st}$ SCI may be transmitted to the receiving UE through a PSCCH. Also, for example, the $2^{nd}$ SCI may be transmitted to the receiving UE through a (independent) PSCCH or may be piggybacked and transmitted together with data through a PSSCH.

Meanwhile, in the present disclosure, for example, the term "configure/configured" or the term "define/defined" may refer to (pre)configuration from a base station or a network (through pre-defined signaling (e.g., SIB, MAC, RRC, etc.)) (for each resource pool).

Meanwhile, in the present disclosure, for example, since an RLF may be determined based on out-of-synch (OOS) indicator(s) or in-synch (IS) indicator(s), the RLF may be replaced/substituted with out-of-synch (OOS) indicator(s) or in-synch (IS) indicator(s).

Meanwhile, in the present disclosure, for example, an RB may be replaced/substituted with a subcarrier. Also, in the present disclosure, for example, a packet or a traffic may be replaced/substituted with a TB or a MAC PDU based on a transmission layer.

Meanwhile, in the present disclosure, a CBG may be replaced/substituted with a TB.

Meanwhile, in the present disclosure, for example, a source ID may be replaced/substituted with a destination ID.

Meanwhile, in the present disclosure, for example, an L1 ID may be replaced/substituted with an L2 ID. For example, the L1 ID may be an L1 source ID or an L1 destination ID. For example, the L2 ID may be an L2 source ID or an L2 destination ID.

Meanwhile, in the present disclosure, for example, an operation of the transmitting UE to reserve/select/determine retransmission resource(s) may include: an operation of the transmitting UE to reserve/select/determine potential retransmission resource(s) for which actual use will be determined based on SL HARQ feedback information received from the receiving UE.

Meanwhile, in the present disclosure, a sub-selection window may be replaced/substituted with a selection window and/or the pre-configured number of resource sets within the selection window, or vice versa.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in the CG type 1, a grant may be provided by RRC signaling and may be stored as a configured grant. For example, in the CG type 2, a grant may be provided by a PDCCH, and may be stored or deleted as a configured grant based on L1 signaling indicating activation or deactivation of the grant.

Meanwhile, in the present disclosure, a channel may be replaced/substituted with a signal, or vice versa. For example, transmission/reception of a channel may include transmission/reception of a signal. For example, transmission/reception of a signal may include transmission/reception of a channel. In addition, for example, cast may be replaced/substituted with at least one of unicast, groupcast, and/or broadcast, or vice versa. For example, a cast type may be replaced/substituted with at least one of unicast, groupcast, and/or broadcast, or vice versa.

Meanwhile, in the present disclosure, a resource may be replaced/substituted with a slot or a symbol, or vice versa. For example, the resource may include a slot and/or a symbol.

Meanwhile, in the present disclosure, a priority may be replaced/substituted with at least one of logical channel prioritization (LCP), latency, reliability, minimum required communication range, prose per-packet priority (PPPP), sidelink radio bearer (SLRB), QoS profile, QoS parameter and/or requirement, or vice versa.

Meanwhile, in various embodiments of the present disclosure, the reservation resource and/or the selection resource may be replaced/substituted with a sidelink grant (SL GRANT).

Meanwhile, in various embodiments of the present disclosure, latency may be replaced/substituted with a packet delay budget (PDB).

Meanwhile, in various embodiments of the present disclosure, a message for triggering a report on sidelink channel state information/sidelink channel quality information (hereinafter, SL_CSI information) may be replaced/substituted with a sidelink channel state information reference signal (CSI-RS) reception.

Meanwhile, in the present disclosure, blind retransmission may refer that the TX UE performs retransmission without receiving SL HARQ feedback information from the RX UE. For example, SL HARQ feedback-based retransmission may refer that the TX UE determines whether to perform retransmission based on SL HARQ feedback information received from the RX UE. For example, if the TX UE receives NACK and/or DTX information from the RX UE, the TX UE may perform retransmission to the RX UE.

Meanwhile, in the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, in the present disclosure, a Uu channel may include a UL channel and/or a DL channel. For example, the UL channel may include a PUSCH, a PUCCH, a sounding reference Signal (SRS), etc. For example, the DL channel may include a PDCCH, a PDSCH, a PSS/SSS, etc. For example, a SL channel may include a PSCCH, a PSSCH, a PSFCH, a PSBCH, a PSSS/SSSS, etc.

Meanwhile, in the present disclosure, sidelink information may include at least one of a sidelink message, a sidelink packet, a sidelink service, sidelink data, sidelink control information, and/or a sidelink transport block (TB). For example, sidelink information may be transmitted through a PSSCH and/or a PSCCH.

In the meantime, for example, when sidelink channel state information/channel quality information (e.g., RSRP/RSRQ, CQI/RI/PMI) is (mutually) is exchanged or reported between UEs performing sidelink communication (e.g., unicast), the UE(s) may adaptively adjust parameters related to transmission. For example, the parameters related to transmission may include transmission power, the number of retransmissions, the number of retransmissions related to a specific transport block, the size of time/frequency resource(s), an effective coding rate, an MCS value, and the like. For example, when sidelink channel state information/channel quality information is exchanged or reported between UEs performing sidelink communication, the UE(s) may adaptively control transmission-related parameters based on changes in sidelink channel state/sidelink channel quality. Through this, the UE can efficiently satisfy requirements related to the target service (e.g., reliability, latency, minimum required communication range, etc.).

Meanwhile, for example, the UE may transmit the sidelink channel state information/sidelink channel quality information (hereinafter, SL_CSI information), and the UE may select or reserve a resource related to transmission of the sidelink channel state information/sidelink channel quality information. Here, for example, according to various embodiments of the present disclosure, the UE may differently or independently configure whether the following rule is applied or a parameter related to enabling/disabling of the following rule based on resource pool and/or service type/type and/or service priority and/or cast type (e.g., unicast, groupcast, broadcast) and/or destination UE and/or L1 destination/source ID or L2 destination/source ID and/or groupcast option and/or QoS parameter(s) and/or (resource pool) congestion level and/or mode type and/or whether to transmit only SL_CSI information, and/or numerology (e.g., subcarrier spacing, CP length). For example, the group cast option may include a method of transmitting NACK information only when PSSCH decoding/reception fails, a method of transmitting ACK information when PSSCH decoding/receiving is successful, and a method of transmitting NACK information when PSSCH decoding/reception fails. For example, whether only SL_CSI information is transmitted may include a case in which SL_CSI information and a data information/service packet are simultaneously transmitted and a case in which only SL_CSI information is transmitted. In this case, a pre-configured time window (SL_RPWIN) length may be configured differently based on whether only SL_CSI information is transmitted. For example, when the SL_CSI information and the data information/service packet are simultaneously transmitted, the pre-configured time window SL_RPWIN may be configured longer or shorter.

For example, the parameter related to whether the following (some part of) rules are applied or whether to enable/disable the following rules is the maximum or minimum pre-configured time window (hereinafter, SL_RPWIN) length/CSI_QINF/RP_TWIN/CSI_LR, a threshold, a maximum or minimum selection/sensing window length, and the like. Here, for example, CSI_QINF may be information related to a logical channel priority (LCP) and/or a sidelink radio bearer (SLRB) and/or QoS profile/parameter(s) and/or QoS requirement(s) (e.g., a priority, delay, reliability, minimum required communication range) and/or the maximum number of allowed retransmissions and/or whether to enable/disable sidelink HARQ and/or an SL HARQ feedback type. For example, the RP_TWIN may be a time at which the receiving UE needs to perform or transmit a report related to SL_CSI information. For example, the CSI_LR may be a pre-configured delay requirement.

Also, for example, the following (some part of) proposed schemes/rules may be applied when SL_CSI information is transmitted in a higher layer signaling (e.g., MAC CE/PPDU, RRC) or a physical layer signaling (e.g., transmitted using some resource(s) on PSSCH). Also, for example, when the following condition is satisfied, the transmitting UE may be configured/allowed to perform sidelink CSI-RS transmission to the receiving UE. Here, for example, when the above rule is applied, sidelink CSI-RS transmission and/or sidelink CSI-RS reception may implicitly trigger a report related to SL_CSI information.

For example, when the transmitting UE has a PSSCH and/or packet/data to be transmitted to the receiving UE, the transmitting UE may be configured/allowed to perform sidelink CSI-RS transmission to the receiving UE.

And/or, for example, when reporting of SL_CSI information is enabled, the transmitting UE may be configured/allowed to perform sidelink CSI-RS transmission to the receiving UE. And/or, here, for example, the reporting related to SL-CSI information may be enabled or disabled, based on resource pool and/or service type/type and/or service priority and/or cast type (e.g., unicast, groupcast, broadcast) and/or destination UE and/or L1 destination/source ID or L2 destination/source ID and/or groupcast option and/or QoS parameter(s) and/or (resource pool) congestion level and/or mode type and/or whether to transmit only SL_CSI information, and/or numerology (e.g., subcarrier spacing, CP length), and/or specifically predefined signaling (e.g., PC5 RRC signaling between the transmitting UE and the receiving UE, SIB/RRC signaling transmitted from the base station, PRECONFIGURATION by the network, etc.). For example, the group cast option may include a method of transmitting NACK information only when PSSCH decoding/reception fails, a method of transmitting ACK information when PSSCH decoding/receiving is successful, and a method of transmitting NACK information when PSSCH decoding/reception fails. For example, whether only SL_CSI information is transmitted may include a case in which SL_CSI information and a data information/service packet are simultaneously transmitted and a case in which only SL_CSI information is transmitted. In this case, an SL_RPWIN length may be configured differently based on whether only SL_CSI information is transmitted. For example, when the SL_CSI information and the data information/service packet are simultaneously transmitted, the SL_RPWIN may be configured longer or shorter.

And/or, for example, when the transmitting UE triggers a report related to SL_CSI information through a pre-configured field on PSCCH or PSSCH (e.g., SCI) to the receiving UE, the transmitting UE may be configured/allowed to perform sidelink CSI-RS transmission to the receiving UE.

On the other hand, for example, the sidelink communication environment may have relatively severe interference change. For example, in the sidelink communication environment, the change in interference may be relatively severe compared to the communication environment between the base station and the UE due to the mobility/sensing-based resource selection/reservation of the UE. For example, the receiving UE may transmit or perform a report related to sidelink channel state information/sidelink channel quality information within a pre-configured time window. For example, the receiving UE may transmit or perform a report related to sidelink channel state information/sidelink channel quality information triggered by the transmitting UE within a pre-configured time window, in order to alleviate the aging problem of the measured sidelink channel state information/sidelink channel quality information.

Figure 12:
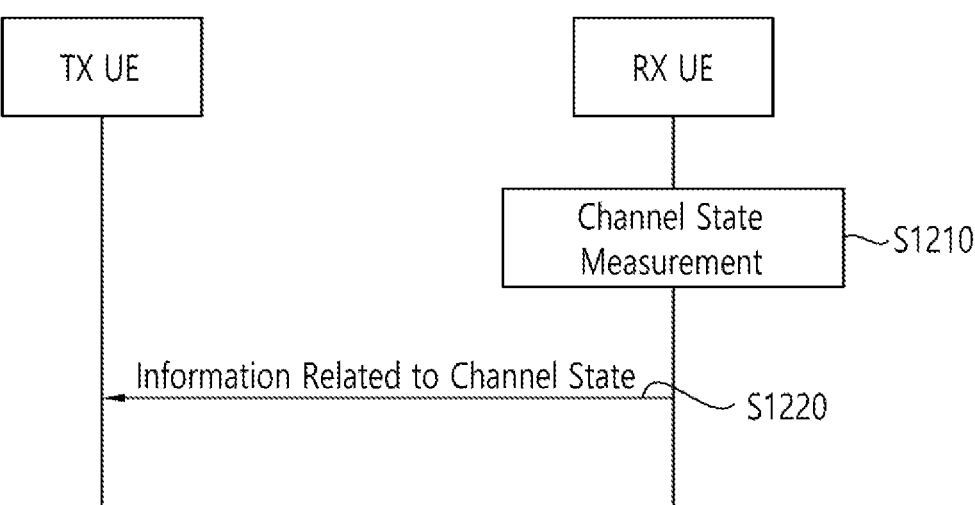
FIG. 12 is a diagram illustrating a method for a receiving UE to measure a channel state and transmit information related to the channel state to a transmitting UE, according to an embodiment of the present disclosure.

FIG. 12 is a diagram illustrating a method for a receiving UE to measure a channel state and transmit information related to the channel state to a transmitting UE, according to an embodiment of the present disclosure. FIG. 12 may be combined with various embodiments.

Referring to FIG. 12, in step S1210, a receiving UE may measure a channel state between a transmitting UE and a receiving UE. In step S1220, the receiving UE may transmit information related to the measured channel state to the transmitting UE. For example, the receiving UE may transmit information related to the measured channel state to the transmitting UE through a resource that satisfies a specific condition in RP_TWIN. For example, if there is no resource satisfying a specific condition in RP_TWIN, the receiving UE may reselect or reserve another resource for reporting channel state information. Here, for example, RP_TWIN may be a time at which the receiving UE needs to perform or transmit a report related to SL_CSI information. A method for a receiving UE to measure a channel state and transmit information related to the channel state to a transmitting UE according to various embodiments of the present disclosure will be described.

For example, the sidelink communication environment may have relatively severe interference changes. For example, in the sidelink communication environment, the change in interference may be relatively severe compared to the communication environment between the base station and the UE due to the mobility/sensing-based resource selection/reservation of the UE. For example, the receiving UE may transmit or perform a report related to sidelink channel state information/sidelink channel quality information (hereinafter referred to SL_CSI information) within a pre-configured time window. For example, the receiving UE may transmit or perform a report related to sidelink channel state information/sidelink channel quality information triggered by the transmitting UE within a pre-configured time window information (hereinafter referred to SL_RPWIN), in order to alleviate the aging problem of the measured sidelink channel state information/sidelink channel quality information. Here, for example, a time point at which the receiving UE receives a message for triggering a report related to sidelink channel state information/sidelink channel quality information from the transmitting UE may be 'Slot #N'. The receiving UE may transmit or perform a report related to sidelink channel state information/sidelink channel quality information in 'Slot #(N+SL_RPWIN)'. Also, for example, when sidelink channel state information/sidelink channel quality information is signaled (e.g., MAC CE/PDU, RRC)

from a higher layer to a UE, the UE may newly designate or configure information (hereinafter referred to CSI_QINF) related to a logical channel priority (LCP) and/or a sidelink radio bearer (SLRB) and/or QoS profile/parameter(s) and/or QoS requirement(s) (e.g., a priority, delay, reliability, minimum required communication range) and/or the maximum number of allowed retransmissions and/or whether to enable/disable sidelink HARQ and/or an SL HARQ feedback type. For example, the SL HARQ feedback type may include a method of transmitting NACK information only when PSSCH decoding/reception fails, transmitting ACK information when PSSCH decoding/receiving is successful, and transmitting NACK information when PSSCH decoding/reception fails. Here, for example, CSI_QINF may be configured as service-related information/parameter(s). For example, CSI_QINF may be configured as information/parameter(s) related to the highest priority service or pre-configured service allowed on the resource pool being performed between the transmitting UE and the receiving UE. For example, CSI_QINF may be configured as information/parameter(s) related to the highest priority service or pre-configured service allowed and related to the carrier and/or sidelink BWP being performed between the transmitting UE and the receiving UE. Here, for example, the UE may select or reserve a resource related to the SL_CSI information report based on the following rule, and the UE may transmit the SL_CSI information report based on the following rule. Here, for example, the CSI_QINF value (e.g., LCP, priority, latency) related to SL_CSI information may be configured to be a relatively greater or less value and/or a tight or loose value than the value of (related) (service) data. For example, the UE may configure/exchange a CSI_QINF value (e.g., LCP, priority, and latency) related to SL_CSI information through PC5 RRC signaling. Here, for example, the UE may configure a priority and/or LCP value related to the SL_CSI information to be a value greater than or equal to or greater than the priority and/or LCP value related to a service/message performed by the UE. For example, the UE may configure a priority and/or LCP value related to the SL_CSI information to be a value greater than or equal to or greater than the highest priority and/or LCP value related to a service/message performed by the UE. For example, the UE may configure the priority and/or LCP value related to the SL_CSI information to be the same as the highest priority and/or LCP value related to the service/message performed by the UE. Here, for example, the UE may configure a latency value related to SL_CSI information to be a value less than or equal to or less than a latency value related to a service/message performed by the UE. For example, the UE may configure a delay value related to the SL_CSI information to be a value less than or equal to or less than the minimum delay value related to the service/message performed by the UE. For example, the UE may configure or designate a delay value related to SL_CSI information to be the same as the minimum delay value related to the service/message performed by the UE. For example, even when a value related to SL_CSI information is configured by a base station/network, the above-described method of configuring a value related to SL_CSI information may be applied. For example, even when the value related to SL_CSI information is specifically configured in relation to the resource pool and/or service type/priority by the base station/network, the method of configured the value related to the SL_CSI information described above may be applied. Here, for example, the rule may be applied when SL_RPWIN and/or CSI_QINF related to reporting on SL_CSI information is configured.

For example, if there is an existing selected/reserved resource (hereinafter referred to as ORI_RSC) that satisfies the following conditions within the time (hereinafter referred to RP_TWIN) for which the receiving UE needs to perform or transmit a report related to SL_CSI information, the receiving UE may transmit SL_CSI information to the transmitting UE through the selected/reserved resource. Here, for example, RP_TWIN may be 'SLOT #(N+SL_RP-WIN)' determined based on a pre-configured SL_RPWIN value and/or 'Slot #(N+CSI_LR)' or 'Slot #(N+CSI_LR–DE_OFFSET)' determined based on pre-configured CSI_QINF information (e.g. delay requirements (hereinafter CSI_LR)). Here, for example, the DE_OFFSET value may be a time for the transmitting UE to decode the SL_CSI information reported by the receiving UE. For example, RP_TWIN may be one of 'SLOT #(N+SL_RPWIN)', 'Slot #(N+CSI_LR)', or 'Slot #(N+CSI_LR-DE_OFFSET)'.

On the other hand, for example, if there is no existing selected/reserved resource (ORI_RSC) that satisfies the following conditions within the time (RP_TWIN) during which the receiving UE needs to perform or transmit a report related to SL_CSI information, the receiving UE may trigger an operation of selecting/reserving a (transmission) resource for reporting related to SL_CSI information. Here, for example, when the receiving UE selects/reserves (transmission) resource(s) related to reporting on SL_CSI information, if there are already selected/reserved resources, the receiving UE may determine (transmission) resource(s) on the remaining slots except for the slot including the selected/reserved resource as a sensing-based selectable/reservable candidate. For example, the already selected/reserved resource(s) may be resource(s) that does not satisfy the following (some part of) conditions. And/or the receiving UE may configure a selection window (e.g., a time domain/window in which a sensing-based selectable/reservable transmission resource candidate may exist) for selecting/reserving resources related to transmission of SL_CSI information based on information related to SL_RPWIN and/or CSI_QINF (e.g., CSI_LR). Here, for example, when the receiving UE configures the selection window, the receiving UE may configure the selection window from 'Slot #(N+PRC_OFFSET)' to 'Slot #(N+SL_RPWIN)' or 'Slot #(N+CSI_LR)' or 'Slot #(N+CSI_LR-DE_OFFSET)'. Here, for example, the PRC_OFFSET value may be a (time) offset value based on a time required for decoding a message for triggering a report related to SL_CSI information received in 'Slot #N', and/or a time required for processing related to SL_CSI measurement and information, etc.

For example, if ORI_RSC exists in RP_TWIN, the receiving UE may transmit, regardless of whether the following (some part of) conditions are satisfied, to the transmitting UE through ORI_RSC, SL_CSI information and/or perform multiplexing transmission between SL_CSI information and (service) data and/or transmit a plurality of MAC PDUs related to SL_CSI information and (service) data. And/or, when ORI_RSC exists in RP_TWIN, the receiving UE may omit/skip (service) data transmission on ORI_RSC and transmit or perform a report related to SL_CSI information. And/or, when ORI_RSC exists in RP_TWIN, the operation of the receiving UE may independently trigger an operation of selecting/reserving a (transmission) resource related to reporting related to SL_CSI information. For example, the receiving UE may select/reserve a resource different from ORI_RSC and transmit or perform a report related to SL_CSI information.

Condition 1

For example, a case in which a priority (e.g., LCP) related to ORI_RSC is equal to or higher than a priority related to (pre-configured) SL_CSI information. For example, a case in which the highest/maximum service/data priority (e.g., LCP) related to ORI_RSC and/or the priority determined for selecting/reserving sensing and resources related to ORI_RSC is relatively equal to or higher than the priority related to (pre-configured) SL_CSI information or the pre-configured threshold.

And/or, for example, a case in which the highest/maximum service/data priority (e.g., LCP) related to ORI_RSC and/or the priority determined for selecting/reservation of sensing and resources related to ORI_RSC is relatively equal to or less than the priority related to (pre-configured) SL_CSI information or pre-configured threshold value.

And/or, for example, a case in which a latency value related to ORI_RSC is shorter than a latency value related to SL_CSI information. For example, a case in which a latency value for the shortest service/data related to ORI_RSC is shorter than a delay value related to the pre-configured SL_CSI information or a pre-configured threshold value.

And/or, for example, a case in which a delay value assumed or configured when sensing and resource selection/reservation related to ORI_RSC is performed is shorter than a delay value related to SL_CSI information. For example, a case in which a delay value assumed or configured when sensing and resource selection/reservation related to ORI_RSC is performed is shorter than a delay value related to pre-configured SL_CSI information or pre-configured threshold value.

And/or, for example, a case in which a latency value related to ORI_RSC is longer than a latency value related to SL_CSI information. For example, a case in which a latency value for the shortest service/data related to ORI_RSC is longer than a delay value related to the pre-configured SL_CSI information or pre-configured threshold value.

And/or, for example, a case in which a delay value assumed or configured when sensing and resource selection/reservation related to ORI_RSC is performed is longer than a delay value related to SL_CSI information. For example, a case in which a delay value assumed or configured when sensing and resource selection/reservation related to ORI_RSC is performed is longer than a delay value related to pre-configured SL_CSI information or a pre-configured threshold value.

And/or, for example, a case in which a latency value related to ORI_RSC is the same as a latency value related to SL_CSI information. For example, a case in which a latency value for the shortest service/data related to ORI_RSC is the same as a delay value related to the pre-configured SL_CSI information or a pre-configured threshold value.

And/or, for example, a case in which a delay value assumed or configured when sensing and resource selection/reservation related to ORI_RSC is performed is the same as a delay value related to SL_CSI information. For example, a case in which a delay value assumed or configured when sensing and resource selection/reservation related to ORI_RSC is performed is the same as a delay value related to pre-configured SL_CSI information or a pre-configured threshold value.

And/or, here, for example, when the Condition 1 is satisfied, the receiving UE may omit/skip transmission of (service) data of relatively low priority and/or long latency on ORI_RSC, and may report related to SL_CSI information. And/or, for example, the receiving UE may only transmit (service) data corresponding to a relatively high priority and/or a short latency value or a tight QoS requirement on ORI_RSC. For example, the receiving UE may omit/skip transmission of (service) data corresponding to a relatively low priority and/or a long delay value or a loose QoS requirement on ORI_RSC.

Condition 2

For example, a case in which the size of time/frequency resource(s) and/or the number of retransmission resources related to ORI_RSC and/or maximum number of retransmissions/maximum number of allowed retransmissions/determined maximum number of retransmissions and/or whether sidelink HARQ feedback operation is supported (e.g., whether to select/reserve a resource based on a sidelink HARQ feedback operation) and/or a Sidelink HARQ feedback type and/or transmit power value and/or supportable effective coding rate value satisfies a (pre-configured) requirement of SL_CSI information or a pre-configured threshold.

Here, for example, ORI_RSC that satisfies the above Condition 2 may be a resource satisfying (pre-configured) CSI_QINF information/requirement (e.g., priority, delay, reliability, minimum required communication range). And/or, the Condition 2 may be a condition for checking whether a resource satisfies (pre-configured) CSI_QINF information/requirement.

Condition 3

For example, a case in which transmission of SL_CSI information on ORI_RSC and/or multiplexing transmission between SL_CSI information and (service) data does not exceed a threshold of a pre-configured effective coding rate. And/or, for example, a case in which transmission of SL_CSI information based on a pre-configured MCS value (e.g., QPSK) on ORI_RSC is supported. And/or, for example, a case in which transmission of SL_CSI information based on transport block/MAC PDU size is supported on ORI_RSC.

And/or, here, for example, on ORI_RSC, multiplexing transmission between SL_CSI information and (service) data or transmission of a plurality of MAC PDUs related to SL_CSI information and (service) data may be allowed when a priority (e.g., LCP) and/or latency value related to service) data is equal to or higher than a priority and/or delay value of SL_CSI information. And/or, for example, on ORI_RSC, multiplexing transmission between SL_CSI information and (service) data or transmission of a plurality of MAC PDUs related to SL_CSI information and (service) data may be allowed when a priority (e.g., LCP) and/or latency value related to service) data is equal to or less than a priority and/or delay value of SL_CSI information. And/or, when a (service) data-related QoS requirement is equal to and/or tighter or looser than a QoS requirement of SL_CSI information, it may be allowed. For example, when a (service) data-related latency requirement is relatively short compared to a latency requirement for SL_CSI information, it may be allowed. For example, when a reliability requirement related to (service) data is relatively high compared to a reliability requirement for SL_CSI information, it may be allowed.

For example, when the receiving UE performs multiplexing transmission between SL_CSI information and (service) data or transmission of a plurality of MAC PDUs related to SL_CSI information and (service) data, the receiving UE may designate/consider MAC PDU to which priority field and/or QoS parameter field and/or multiplexing is applied on the related PSCCH (e.g., SCI) as a relatively high priority value among SL_CSI information and (service) data among and/or as a tight QoS parameter value (e.g., short delay, high reliability, long minimum required communication range)

And/or, the receiving UE may designate/consider the priority field and/or the QoS parameter field as a pre-configured (specific) value on the related PSCCH (e.g., SCI).

Here, for example, on ORI_RSC, when multiplexing transmission between SL_CSI information and (service) data or transmission of a plurality of MAC PDUs related to SL_CSI information exceeds a threshold of a pre-configured effective coding rate, the receiving UE may perform a transmission operation corresponding to a relatively high priority and/or a short latency value or a tight QoS requirement. For example, the receiving UE may omit/skip a transmission operation corresponding to a relatively low priority and/or a long latency value or a loose QoS requirement. Also, for example, when priority or QoS requirements are the same, the receiving UE may perform a randomly selected transmission operation, transmit randomly selected SL_CSI, or transmit randomly selected (service) data. And/or, the receiving UE may transmit SL_CSI or (service) data or perform transmission for a pre-configured type/type. And/or, SL_CSI or (service) data may be transmitted or transmission for a pre-configured classification/type may be always performed.

Condition 4

For example, a case in which (service) data transmission is not actually performed on ORI_RSC. Here, for example, the Condition 4 may be applied when a priority (e.g., LCP) related to (service) data transmission on ORI_RSC is equal to or higher than that of SL_CSI information. For example, the Condition 4 may be applied when a priority (e.g., LCP) related to (service) data transmission on ORI_RSC is equal to or less than that of SL_CSI information. The Condition 4 may be applied when the highest priority (e.g., LCP) and/or the shortest delay value related to (service) data transmission on ORI_RSC is equal to, higher than, or less than the priority and/or delay value of SL_CSI information. And/or, for example, the Condition 4 may be applied when a QoS requirement related to (service) data transmission on ORI_RSC is equal to or tighter than a QoS requirement of SL_CSI information. For example, Condition 4 may be applied when a QoS requirement related to (service) data transmission on ORI_RSC is equal to or looser than a QoS requirement of SL_CSI information.

For example, RRC may configure parameter(s) to control the SL-CSI report/reporting procedure. For example, the parameter(s) may include sl-LatencyBound-CSI-Report maintained for each PC5-RRC connection. Here, for example, the sl-LatencyBound-CSI-Report may indicate, based on the number of slots, a delay time boundary of SL CSI reporting from a related SL CSI triggering. For example, a value of sl-CSI-ReportTimer may be the same as a delay requirement of SL-CSI reporting in the sl-Latency-Bound-CSI-Report set in RRC. For example, if the SL-CSI reporting is triggered by SCI and is not canceled, if the sl-CSI-ReportTimer for triggered SL-CSI reporting is not executed, the MAC entity may start sl-CSI-ReportTimer. For example, if the SL-CSI report is triggered by SCI and is not canceled, if the sl-CSI-ReportTimer for the triggered SL-CSI report expires, the MAC entity may cancel the triggered SL-CSI report.

For example, a MAC entity may select to generate a selected sidelink grant corresponding to transmission of a single MAC PDU, and an SL-SCI report may be triggered. In this case, the MAC entity may select a resource pool from among the resource pools. For example, the MAC entity may perform a check to select a transmission resource for the selected resource pool. For example, if selection of a transmission resource is triggered as a result of the check, the MAC entity may select the number of HARQ retransmissions from among the allowed numbers configured by RRC in sl-MaxTxTransNumPSSCH included in sl-PSSCH-TxConfigList. When configured by RRC, it may overlap with the sl-MaxTxTransNumPSSCH indicated in the sl-CBR-PSSCH-TxConfigList for the highest priority of the logical channel allowed on the carrier and CBR measured in a lower layer. For example, as a result of the check, when selecting a transmission resource is triggered, the MAC entity may select the amount of frequency resources within a range configured by RRC between sl-MinSubChannelNumPSSCH and sl-MaxSubChannelNumPSSCH included in sl-PSSCH-TxConfigList, For example, as a result of the check, when selecting a transmission resource is triggered, the MAC entity may randomly select time and frequency resource(s) for one transmission opportunity from the resource(s) indicated by the physical layer, according to the amount of frequency resource(s) selected and the remaining PDB of SL data available in the logical channel(s) allowed in the carrier.

For example, if the MAC entity has an SL resource allocated for new transmission, and the SL-SCH resource can carry/accept a MAC CE reporting SL CSI as a result of logical channel priority and its sub-header(s), the MAC entity may instruct the multiplexing and assembly procedure to generate a MAC CE for reporting sidelink CSI. And, the MAC entity may stop the sl-CSI-ReportTimer for the triggered SL-CSI report/reporting. For example, the MAC entity may cancel the triggered SL-CSI report.

For example, the logical channel may be prioritized in the order of data of SCCH, MAC CE for sidelink CSI reporting, and data of all STCHs. That is, the priority related to the data of the SCCH may be the highest.

According to an embodiment of the present disclosure, the receiving UE may receive latency budget information (hereinafter, CSI_LBT) related to SL CSI report/reporting from the transmitting UE through PC5 RRC signaling. Then, for example, if the receiving UE receives a message requesting SL CSI report at the 'SLOT #N' time point, the receiving UE may consider/determine that SL CSI reporting should be completed to the time point 'SLOT #(N+CSI_LBT)' which is CSI_LBT away from the 'SLOT #N' time point. In this case, for example, a selection window (SELECTION WINDOW) area for selecting a transmission resource used for SL CSI reporting may be determined from the 'SLOT #(N+OFF_VAL)' time point to the 'SLOT #(N+CSI_LBT)' time point. Here, OFF_VAL may include at least one of a time for decoding a message requesting an SL CSI report or a processing time required for SL CSI measurement/information generation. Accordingly, a selection window related to selecting a resource for SL CSI reporting in consideration of the SL CSI reporting completion time and the SL CSI reporting completion time may be clearly determined.

According to an embodiment of the present disclosure, if, up to 'SLOT #(N+CSI_LBT)' for which the SL CSI report should be completed in the time domain, the existing resource (ORI_RSC) selected/reserved by the receiving UE exists and the ORI_RSC can carry/accept the SL CSI report, the receiving UE may transmit an SL CSI report through the ORI_RSC. On the other hand, for example, if, up to 'SLOT #(N+CSI_LBT)' for which SL CSI reporting should be completed in time domain, ORI_RSC does not exist or the ORI_RSC cannot carry/accept the SL CSI report, the r receiving UE may trigger new resource selection for transmitting the SL CSI report. That is, since SL CSI information is directly generated by the MAC entity in the form of MAC CE, by defining a new condition for triggering selection of a resource related to transmission of the SL CSI report, the receiving UE can efficiently transmit the SL CSI report.

According to an embodiment of the present disclosure, in the case of MAC PDU transmission including only the SL CSI report in the MAC CE format, the HARQ feedback request may be always disabled. That is, considering that SL CSI information is directly generated by the MAC entity in the form of MAC CE, the receiving UE can efficiently transmit whether the HARQ feedback request is enabled/disabled through the SL CSI report.

According to an embodiment of the present disclosure, during SL LCP operation, the priority related to the SL CSI report in the MAC CE format may be defined as a higher priority than general SL data. That is, since SL CSI information is directly generated by the MAC entity in the form of MAC CE, by defining a priority between SL CSI and SL data for LCP operation, the receiving UE can efficiently transmit the SL CSI report.

Figure 13:
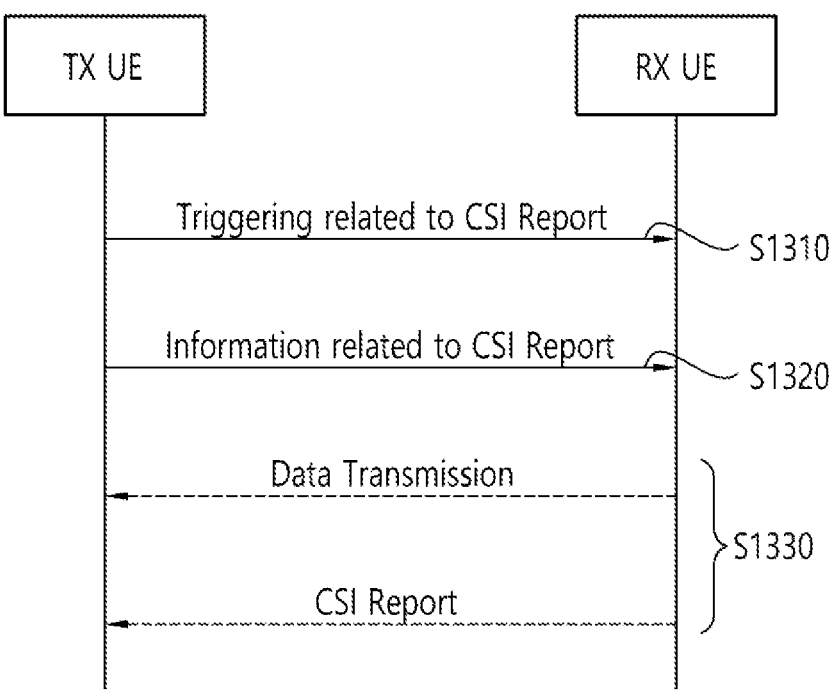
FIG. 13 is a diagram illustrating a procedure for transmitting a CSI report to a transmitting UE through a resource reserved within a time for a receiving UE to transmit a CSI report, according to an embodiment of the present disclosure.
Figure 14:
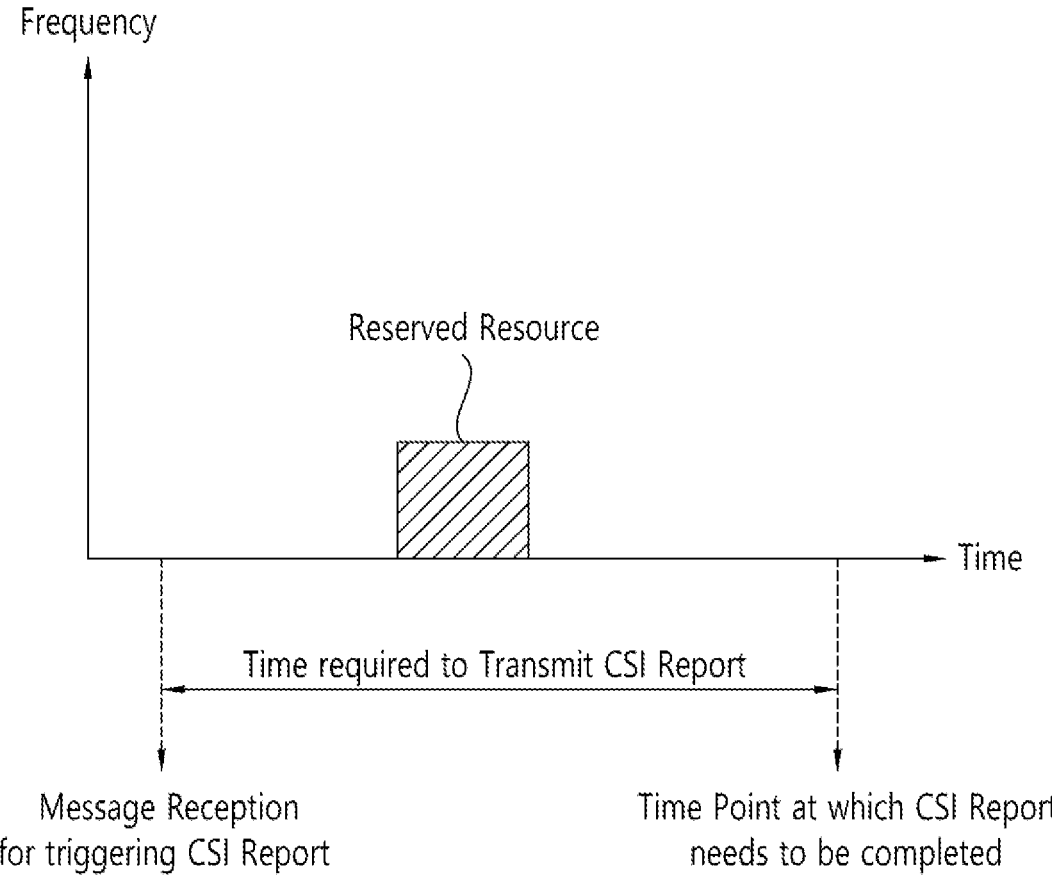
FIG. 14 is a diagram illustrating a case in which a reserved resource exists within a pre-configured time window, according to an embodiment of the present disclosure.

FIG. 13 is a diagram illustrating a procedure for transmitting a CSI report to a transmitting UE through a resource reserved within a time for a receiving UE to transmit a CSI report, according to an embodiment of the present disclosure. FIG. 14 is a diagram illustrating a case in which a reserved resource exists within a pre-configured time window, according to an embodiment of the present disclosure. FIG. 13 and FIG. 14 may be combined with various embodiments of the present disclosure.

Referring to FIG. 13, in step S1310, the transmitting UE may trigger CSI report/reporting to the receiving UE. For example, the transmitting UE may transmit a message for triggering CSI reporting to the receiving UE. For example, the transmitting UE may trigger the CSI report to the receiving UE through a pre-configured field on the PSCCH or PSSCH (e.g., SCI).

In step S1320, the transmitting UE may transmit information related to the CSI report/reporting to the receiving UE. For example, the transmitting UE may transmit information related to CSI reporting to the receiving UE through PC5 RRC signaling. For example, information related to the CSI reporting may include information related to at least one of the logical channel priority (LCP), sidelink radio bearer (SLRB), QoS profile/parameter, QoS requirement (e.g., priority, delay, reliability, minimum required communication range), latency bound, maximum number of allowed retransmissions, whether sidelink HARQ feedback is enabled/disabled, or a groupcast option.

In step S1330, the receiving UE may perform either data transmission or CSI report/reporting to the transmitting UE through a reserved resource. For example, if there is a resource reserved within the time required to transmit the CSI report, the receiving UE may perform the CSI report to the transmitting UE through the reserved resource within the time required to transmit the CSI report.

Referring to FIG. 14, the time required to transmit the CSI report/reporting may be a time from a time when a receiving UE receives a message for triggering the CSI report from a transmitting UE to a pre-configured time. For example, the time required to transmit the CSI report may be a time from when the receiving UE receives a message for triggering a CSI report from the transmitting UE to a time set based on the latency bound.

For example, the time required to transmit the CSI report/reporting may be a time based on the latency bound. For example, the time required to transmit the CSI report may be determined based on a pre-configured time window. For example, the time required to transmit the CSI report may be determined based on pre-configured CSI report-related information (e.g., delay requirement). For example, the time required to transmit the CSI report may be determined based on information related to the pre-configured CSI reporting and the time for the transmitting UE to decode the CSI reported by the receiving UE.

For example, the time required to transmit the CSI report may be set differently depending on whether only CSI is transmitted. For example, whether to transmit only the CSI may include a case in which the CSI and data information/service packet(s) are simultaneously transmitted and a case in which only the CSI information is transmitted. For example, when the CSI and data information/service packet(s) are simultaneously transmitted, the time required to transmit the CSI report may be set longer than when only the CSI information is transmitted.

For example, a resource reserved for transmitting a CSI report/reporting may be as follows. For example, a reserved resource that exists within the time required to transmit the CSI report may be a resource in which a priority related to the reserved resource is equal to or lower than a priority related to the CSI. For example, the reserved resource may be a resource in which a delay value related to the reserved resource is equal to or longer than a delay value related to the CSI. For example, the reserved resource may be a resource that satisfies CSI-related requirement, which is related to at least one of the size of time resource, size of frequency resource, number of retransmission resources, maximum number of retransmissions, maximum number of allowed retransmissions, whether to support sidelink HARQ feedback operation, sidelink HARQ feedback type, transmission power value or supportable effective coding rate For example, the reserved resource may be a resource that satisfies information related to CSI reporting (e.g., priority, delay, reliability, minimum required communication range). For example, the reserved resource may be a resource for which transmission of data related to the reserved resource is not performed.

For example, when the multiplexing of data and CSI related to the reserved resource does not exceed a threshold value of a pre-configured effective coding rate, the receiving UE may transmit the multiplexed data to the transmitting UE through the reserved resource by multiplexing CSI and data related to the reserved resource. In this case, when the CSI and data related to the reserved resource are multiplexed, CSI transmission based on a pre-configured MCS value may be supported for the reserved resource. In this case, when the CSI and data related to the reserved resource are multiplexed, CSI transmission of the size of a transport block or MAC PDU may be supported for the reserved resource. In this case, when the CSI and data related to the reserved resource are multiplexed, the priority of data related to the reserved resource may be equal to or higher than that related to CSI. For example, when the CSI and data related to the reserved resource are multiplexed, a delay value related to the reserved resource may be equal to or shorter than a delay value related to the CSI. For example, when the CSI and data related to the reserved resource are multiplexed, reliability of data related to the reserved resource may be higher than reliability related to CSI.

Figure 15:
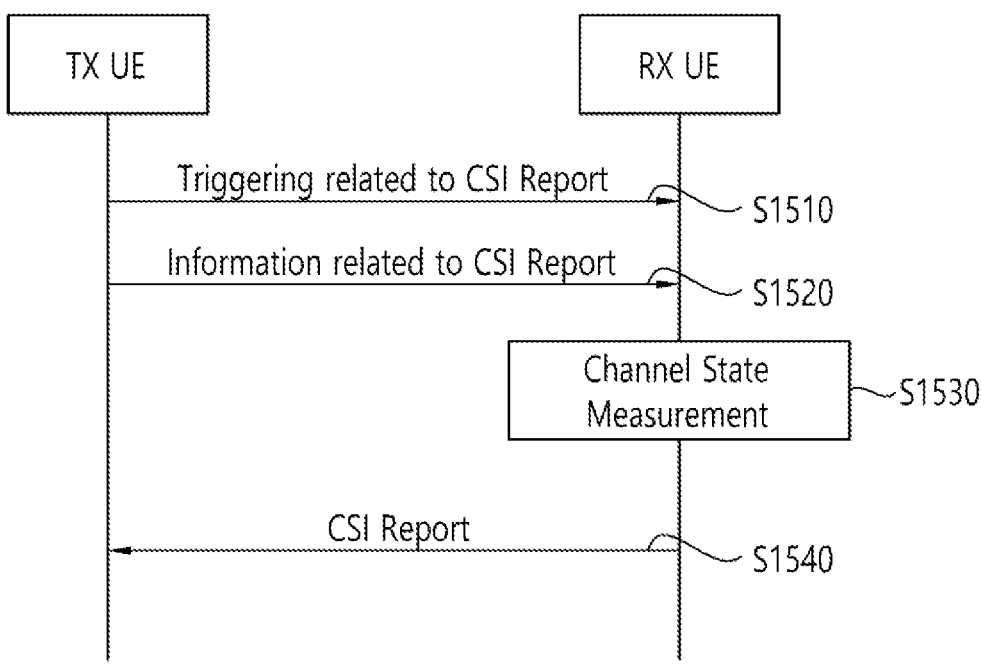
FIG. 15 is a diagram illustrating a procedure for transmitting a CSI report to a transmitting UE through a reserved resource within the time required to transmit the CSI report by a receiving UE, according to an embodiment of the present disclosure.
Figure 16:
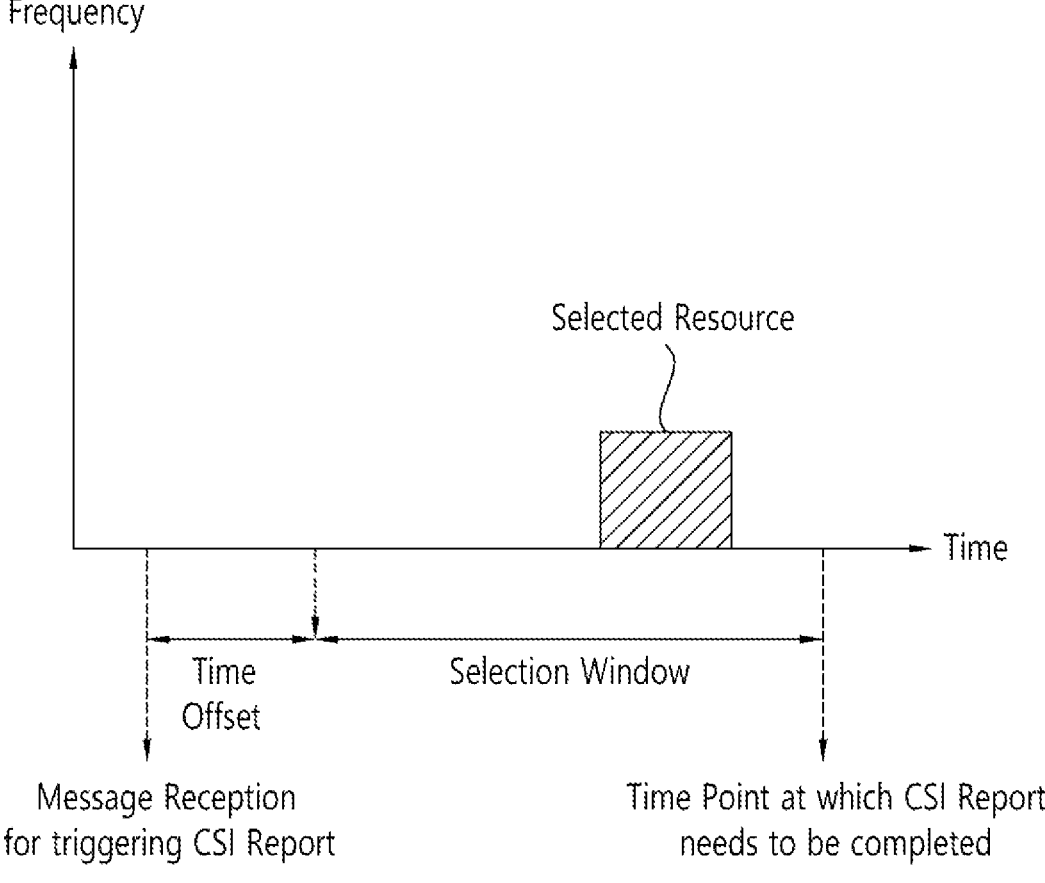
FIG. 16 is a diagram illustrating a resource reserved within the time required to transmit the CSI report, according to an embodiment of the present disclosure.

FIG. 15 is a diagram illustrating a procedure for transmitting a CSI report to a transmitting UE through a reserved resource within the time required to transmit the CSI report by a receiving UE, according to an embodiment of the present disclosure. FIG. 16 is a diagram illustrating a resource reserved within the time required to transmit the CSI report, according to an embodiment of the present disclosure. FIG. 15 and FIG. 16 may be combined with various embodiments of the present disclosure.

FIG. 15 is a diagram illustrating a procedure in which a receiving UE transmits a CSI report to a transmitting UE through a resource selected within a selection window, according to an embodiment of the present disclosure. FIG. 16 is a diagram illustrating a selection window for selecting a resource related to CSI reporting, according to an embodiment of the present disclosure. FIG. 15 and FIG. 16 may be combined with various embodiments of the present disclosure.

Referring to FIG. 15, in step S1510, the transmitting UE may trigger CSI report/reporting to the receiving UE. For example, the transmitting UE may transmit a message for triggering CSI reporting to the receiving UE. For example, the transmitting UE may trigger the CSI report to the receiving UE through a pre-configured field on the PSCCH or PSSCH (e.g., SCI).

In step S1520, the transmitting UE may transmit information related to the CSI report/reporting to the receiving UE. For example, the transmitting UE may transmit information related to CSI reporting to the receiving UE through PC5 RRC signaling. For example, information related to the CSI reporting may include information related to at least one of the logical channel priority (LCP), sidelink radio bearer (SLRB), QoS profile/parameter, QoS requirement (e.g., priority, delay, reliability, minimum required communication range), latency bound, maximum number of allowed retransmissions, whether sidelink HARQ feedback is enabled/disabled, or a groupcast option.

In step S1530, the receiving UE may select a resource for the CSI report/reporting. For example, when a reserved resource does not exist within the time required to transmit the CSI report, an operation for selecting a resource for the CSI report may be triggered for the receiving UE. For example, when a reserved resource that satisfies a specific condition does not exist within the time required to transmit the CSI report, a resource that can be reserved in a slot other than the slot to which the resource belongs can be determined. For example, if the reserved resource does not exist within the time required to transmit the CSI report, the receiving UE may determine a selection window to select the resource for the CSI report. For example, the receiving UE may select a resource for CSI reporting within a selection window.

For example, the time required to transmit the CSI report may be a time based on the latency bound. For example, the time required to transmit the CSI report may be determined based on a pre-configured time window. For example, the time required to transmit the CSI report may be determined based on pre-configured CSI report-related information (e.g., delay requirement). For example, the time required to transmit the CSI report may be determined based on information related to the pre-configured CSI reporting and the time for the transmitting UE to decode the CSI reported by the receiving UE.

For example, the time required to transmit the CSI report may be set differently depending on whether only CSI is transmitted. For example, whether to transmit only the CSI may include a case in which the CSI and data information/service packet(s) are simultaneously transmitted and a case in which only the CSI information is transmitted. For example, when the CSI and data information/service packet(s) are simultaneously transmitted, the time required to transmit the CSI report may be set longer than when only the CSI information is transmitted.

Referring to FIG. 16, the selection window may include a time interval from a time point at which a time offset value is applied to a time point at which a message for triggering the CSI reporting is received to a time point at which the CSI reporting needs to be completed. For example, the selection window may be a time interval from a time point when the receiving UE receives a message for triggering a CSI report from a transmitting UE to a time point set based on at least one of latency bound, time offset value, or information related to the CSI reporting. For example, the time offset value may be determined based on at least one of a time required to decode the message for triggering the CSI report, a time required to measure the CSI, or a time required to process the CSI.

In step S1540, the receiving UE may transmit the CSI report/reporting to the transmitting UE through the selected resource. For example, the resource selected for transmitting the CSI report may be as follows. For example, the selected resource may be a resource in which a priority related to the selected resource is equal to or lower than a priority related to CSI. For example, the selected resource may be a resource in which a delay value related to the selected resource is equal to or longer than a delay value related to the CSI. For example, the selected resource may be a resource that satisfies CSI-related requirement, which is related to at least one of the size of time resource, size of frequency resource, number of retransmission resources, maximum number of retransmissions, maximum number of allowed retransmissions, whether to support sidelink HARQ feedback operation, sidelink HARQ feedback type, transmission power value or supportable effective coding rate For example, the selected resource may be a resource that satisfies information related to CSI reporting (e.g., priority, delay, reliability, minimum required communication range). For example, the selected resource may be a resource for which transmission of data related to the selected resource is not performed.

For example, when the multiplexing of data and CSI related to the selected resource does not exceed a threshold value of a pre-configured effective coding rate, the receiving UE may transmit the multiplexed data to the transmitting UE through the selected resource by multiplexing CSI and data related to the selected resource. In this case, when the CSI and data related to the selected resource are multiplexed, CSI transmission based on a pre-configured MCS value may be supported for the selected resource. In this case, when the CSI and data related to the selected resource are multiplexed, CSI transmission of the size of a transport block or MAC PDU may be supported for the selected resource. In this case, when the CSI and data related to the selected resource are multiplexed, the priority of data related to the selected resource may be equal to or higher than that related to CSI. For example, when the CSI and data related to the selected resource are multiplexed, a delay value related to the selected resource may be equal to or shorter than a delay value related to the CSI. For example, when the CSI and data related to the selected resource are multiplexed, reliability of data related to the selected resource may be higher than reliability related to CSI.

Figure 17:
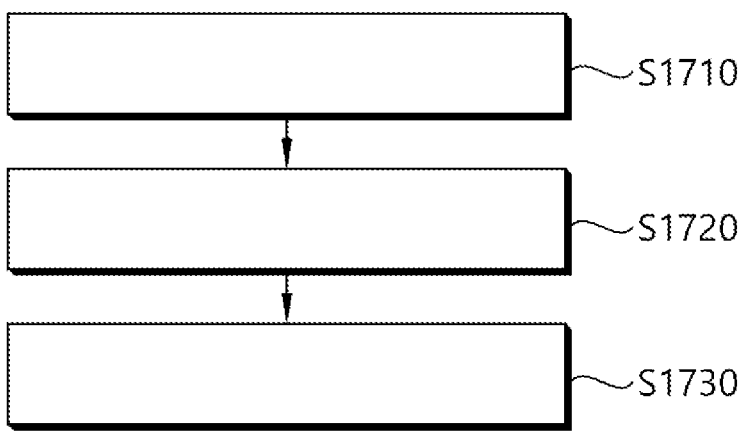
FIG. 17 is a diagram illustrating a method for a first device to transmit a CSI report to a second device through a resource selected within a selection window, according to an embodiment of the present disclosure.

FIG. 17 is a diagram illustrating a method for a first device to transmit a CSI report to a second device through a resource selected within a selection window, according to an embodiment of the present disclosure. FIG. 17 may be combined with various embodiments of the present disclosure.

In step S1710, the first device 100 may receive information related to a latency bound related to sidelink channel state information from the second device 200. For example, the first device 100 may receive information related to a latency bound related to the sidelink channel state information from the second device 200 through PC5-RRC signaling.

In step S1720, the first device 100 may select a resource for transmitting sidelink channel state information in a selection window, based on absence of a reserved resource within a time window for reporting the sidelink channel state information. For example, the time window may be determined based on information related to the latency bound. For example, the selection window may be determined based on at least one of a time window, a time offset value, or a requirement related to the sidelink channel state information. For example, the first device 100 may receive a message triggering a report related to the sidelink channel state information from the second device 200. For example, the start time of the time window may be the time at which a message triggering a report related to the sidelink channel state information is received. For example, the time offset value may be determined based on at least one of a time required to decode a message triggering a report related to the received sidelink channel state information, a time required to measure sidelink channel state information, or a time required to process sidelink channel state information.

In step S1730, the first device 100 may transmit a MAC CE including the sidelink channel state information to the second device 200 within the time window through the selected resource. For example, the first device 100 may transmit the MAC CE to the second device 200 through the selected resource based on the priority of data related to the selected resource being lower than the priority related to the MAC CE including the sidelink channel state information. For example, based on the MAC CE being transmitted, the sidelink HARQ feedback request may be disabled. For example, the first device 100 may omit/skipped transmitting data related to the selected resource based on a priority of data related to the selected resource being lower than a priority related to the MAC CE including the sidelink channel state information.

For example, the selected resource may satisfy a requirement related to pre-configured sidelink channel state information. For example, the requirement related to the pre-configured sidelink channel state information may include at least one of a priority, a latency, a reliability, or a minimum required communication range.

For example, the selected resource may satisfy a requirement related to the sidelink channel state information among at least one of a time interval related to the selected resource, a size of a frequency domain related to the selected resource, a number of retransmission resources related to the selected resource, a number of retransmissions related to the selected resource, whether operation of sidelink HARQ feedback is supported, a sidelink HARQ feedback type, a transmission power related to the selected resource, or a coding rate value related to the selected resource.

For example, the selected resource may be less than a pre-configured threshold value related to a coding rate for transmitting the MAC CE on the selected resource. For example, when transmitting the MAC CE on the selected resource is less than a pre-configured threshold related to a coding rate, the MAC CE may be multiplexed for data related to the selected resource on the selected resource.

For example, in a logical channel priority (LCP) procedure, a priority of sidelink channel state information may be higher than that of data related to traffic.

For example, the MAC CE may be transmitted based on transmission of data related to the selected resource being not performed. For example, the first device 100 may transmit the MAC CE to the second device 100 based on transmission of data related to the selected resource being not performed.

The above-described embodiment may be applied to various devices to be described below. For example, the processor 102 of the first device 100 may control the transceiver 106 to receive information related to a latency bound related to sidelink channel state information from the second device 200. And, the processor 102 of the first device 100 may select a resource for transmitting sidelink channel state information in a selection window, based on absence of a reserved resource within a time window for reporting the sidelink channel state information. Then, the processor 102 of the first device 100 may control the transceiver 106 to transmit a Medium Access Control (MAC) Control Element (CE) including the sidelink channel state information to the second device within the time window through the selected resource to the second device 200.

According to an embodiment of the present disclosure, a first device for performing wireless communication may be provided. For example, the first device may comprise one or more memories storing instructions; one or more transceivers; and one or more processors connected to the one or more memories and the one or more transceivers. The one or more processors may execute the instructions to: receive information related to a latency bound related to sidelink channel state information from a second device; select a resource for transmitting sidelink channel state information in a selection window, based on absence of a reserved resource within a time window for reporting the sidelink channel state information; and transmit a Medium Access Control (MAC) Control Element (CE) including the sidelink channel state information to the second device within the time window through the selected resource. For example, wherein the time window may be determined based on the latency bound. For example, the selection window may be determined based on at least one of the time window, a time offset value, or a requirement related to the sidelink channel state information.

According to an embodiment of the present disclosure, an apparatus configured to control a first UE may be provided. For example, the apparatus may comprise one or more processors; and one or more memories operably connected to the one or more processors and storing instructions, wherein the one or more processors execute the instructions. The one or more processors may execute the instructions to: receive information related to a latency bound related to sidelink channel state information from a second UE; select a resource for transmitting sidelink channel state information in a selection window, based on absence of a reserved resource within a time window for reporting the sidelink channel state information; and transmit a Medium Access Control (MAC) Control Element (CE) including the sidelink channel state information to the second UE within the time window through the selected resource. For example, the time window may be determined based on the latency bound. For example, the selection window may be determined based on at least one of the time window, a time offset value, or a requirement related to the sidelink channel state information.

According to an embodiment of the present disclosure, a non-transitory computer-readable storage medium storing instructions may be provided. For example, it cause a first device to: receive information related to a latency bound related to sidelink channel state information from a second device; select a resource for transmitting sidelink channel state information in a selection window, based on absence of a reserved resource within a time window for reporting the sidelink channel state information; and transmit a Medium Access Control (MAC) Control Element (CE) including the sidelink channel state information to the second device within the time window through the selected resource. For example, the time window may be determined based on the latency bound. For example, the selection window may be determined based on at least one of the time window, a time offset value, or a requirement related to the sidelink channel state information.

Figure 18:
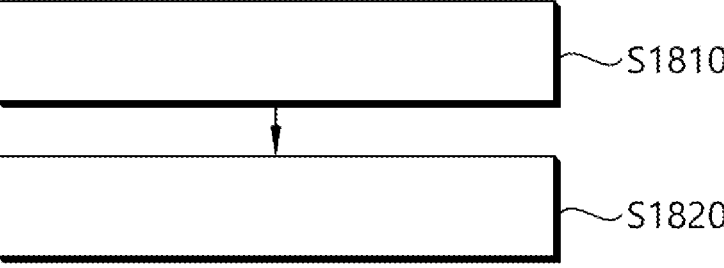
FIG. 18 is a diagram illustrating a method for a first device to transmit a CSI report to a second device through a resource reserved within a time window, according to an embodiment of the present disclosure.

FIG. 18 is a diagram illustrating a method for a first device to transmit a CSI report to a second device through a resource reserved within a time window, according to an embodiment of the present disclosure. FIG. 18 may be combined with various embodiments of the present disclosure.

Referring to FIG. 18, in step S1810, the first device 100 may receive information related to a latency bound related to sidelink channel state information from the second device 200. For example, the first device 100 may receive information related to a latency bound related to the sidelink channel state information from the second device 200 through PC5-RRC signaling.

In step S1820, the first device 100 may transmit, based on presence of a reserved resource within a time window for reporting the sidelink channel state information, one of data or a Medium Access Control (MAC) Control Element (CE) having a higher priority among a priority of data related to the reserved resource and a priority related to the MAC CE including the sidelink channel state information. For example, the first device 100 may receive a message triggering a report related to the sidelink channel state information from the second device 200. For example, the start time of the time window may be the time at which a message triggering a report related to the sidelink channel state information is received.

For example, the first device 100 may transmit the MAC CE to the second device 200 through the reserved resource based on the priority of data related to the reserved resource being lower than the priority related to the MAC CE including the sidelink channel state information. For example, based on the MAC CE being transmitted, the sidelink HARQ feedback request may be disabled. For example, the first device 100 may omit/skipped transmitting data related to the reserved resource based on a priority of data related to the reserved resource being lower than a priority related to the MAC CE including the sidelink channel state information.

For example, the reserved resource may satisfy a requirement related to pre-configured sidelink channel state information. For example, the requirement related to the pre-configured sidelink channel state information may include at least one of a priority, a latency, a reliability, or a minimum required communication range.

For example, the reserved resource may satisfy a requirement related to the sidelink channel state information among at least one of a time interval related to the reserved resource, a size of a frequency domain related to the reserved resource, a number of retransmission resources related to the reserved resource, a number of retransmissions related to the reserved resource, whether operation of sidelink HARQ feedback is supported, a sidelink HARQ feedback type, a transmission power related to the reserved resource, or a coding rate value related to the reserved resource.

For example, the reserved resource may be less than a pre-configured threshold value related to a coding rate for transmitting the MAC CE on the reserved resource. For example, when transmitting the MAC CE on the reserved resource is less than a pre-configured threshold related to a coding rate, the MAC CE may be multiplexed for data related to the reserved resource on the reserved resource.

For example, in a logical channel priority (LCP) procedure, a priority of sidelink channel state information may be higher than that of data related to traffic.

For example, the MAC CE may be transmitted based on transmission of data related to the reserved resource being not performed. For example, the first device 100 may transmit the MAC CE to the second device 100 based on transmission of data related to the reserved resource being not performed.

The above-described embodiment may be applied to various devices to be described below. For example, the processor 102 of the first device 100 may control the transceiver 106 to receive information related to a latency bound related to sidelink channel state information from the second device 200. And, the processor 102 of the first device 100 may control the transceiver 106 to transmit, based on presence of a reserved resource within a time window for reporting the sidelink channel state information, one of data or a Medium Access Control (MAC) Control Element (CE) having a higher priority among a priority of data related to the reserved resource and a priority related to the MAC CE including the sidelink channel state information to the second device According to an embodiment of the present disclosure, a first device for performing wireless communication may be provided. For example, the first device may comprise one or more memories storing instructions; one or more transceivers; and one or more processors connected to the one or more memories and the one or more transceivers. For example, one or more processors may execute the instructions to: receive information related to a latency bound related to sidelink channel state information from a second device; and based on presence of a reserved resource within a time window for reporting the sidelink channel state information, transmit one of data or a Medium Access Control (MAC) Control Element (CE) having a higher priority among a priority of data related to the reserved resource and a priority related to the MAC CE including the sidelink channel state information to the second device. For example, the time window may be determined based on the latency bound.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 19:
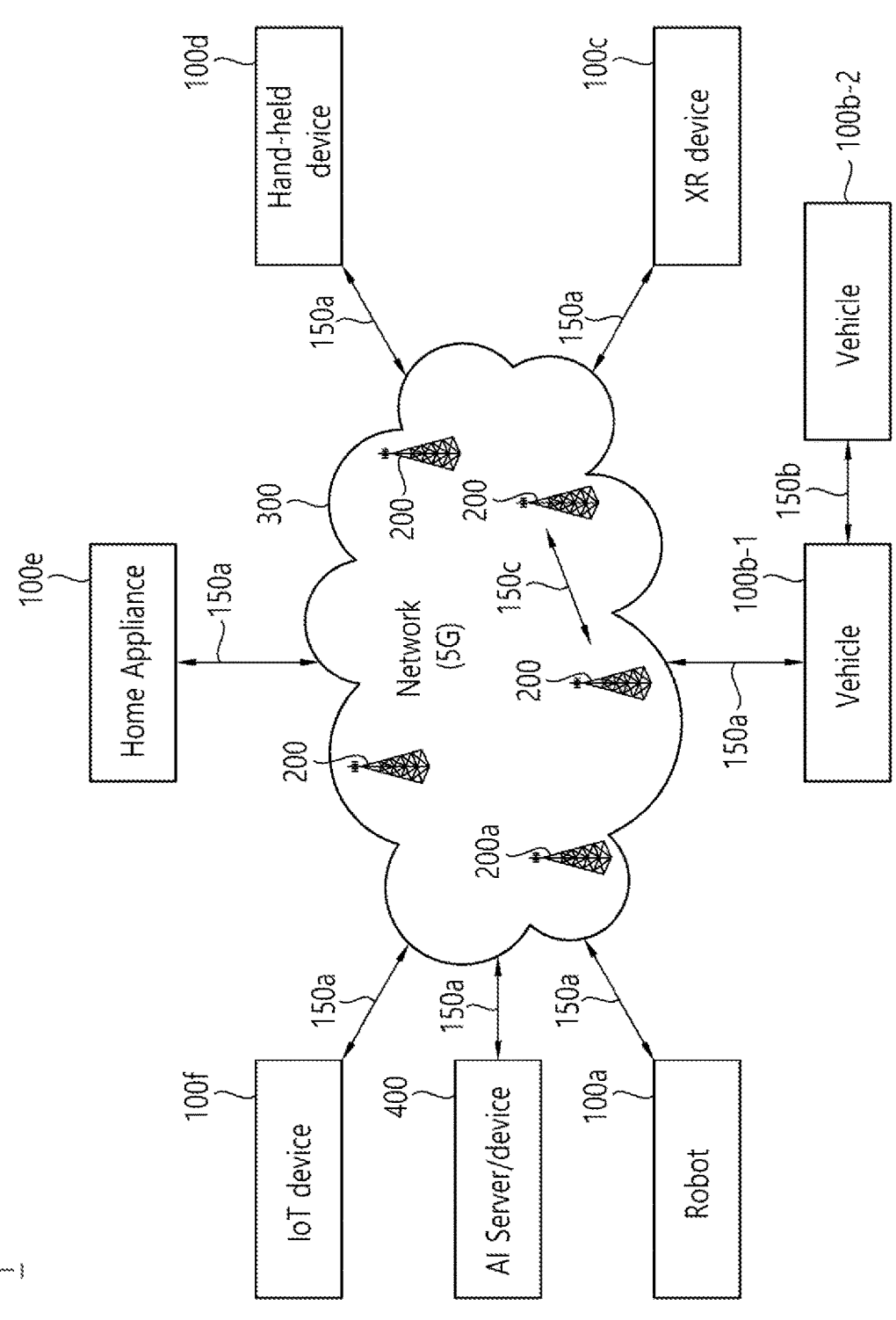
FIG. 19 shows a communication system 1, based on an embodiment of the present disclosure.

FIG. 19 shows a communication system 1, based on an embodiment of the present disclosure.

Referring to FIG. 19, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
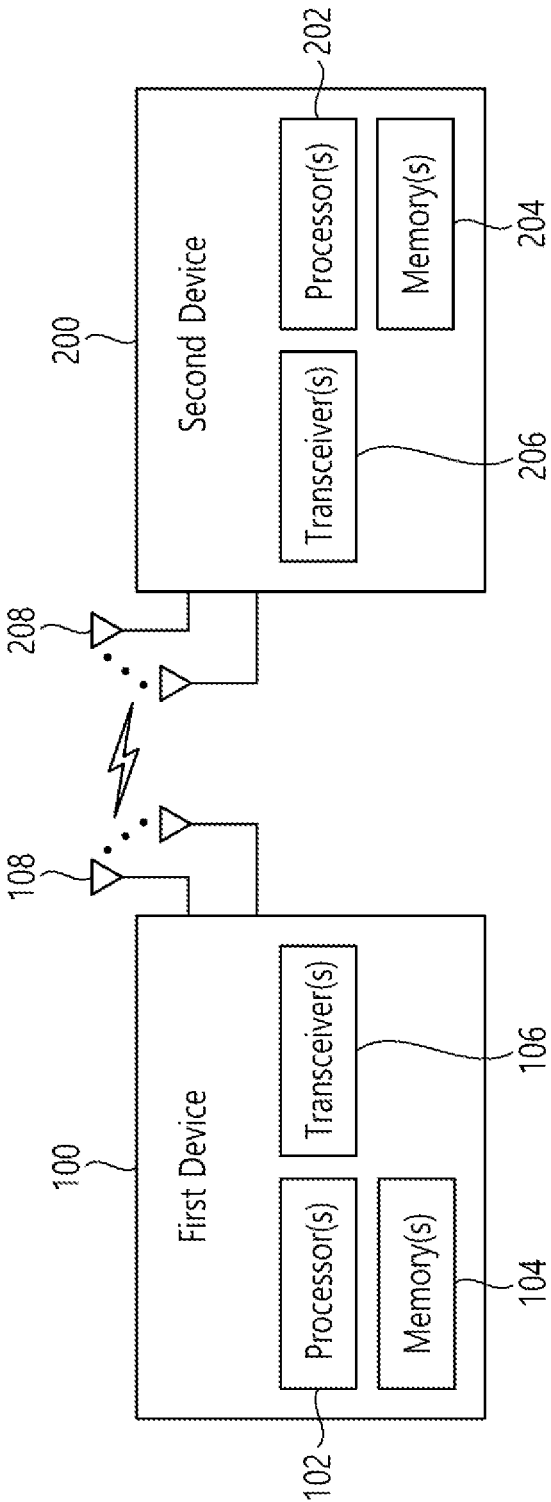
FIG. 20 shows wireless devices, based on an embodiment of the present disclosure.

FIG. 20 shows wireless devices, based on an embodiment of the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers

106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 21:
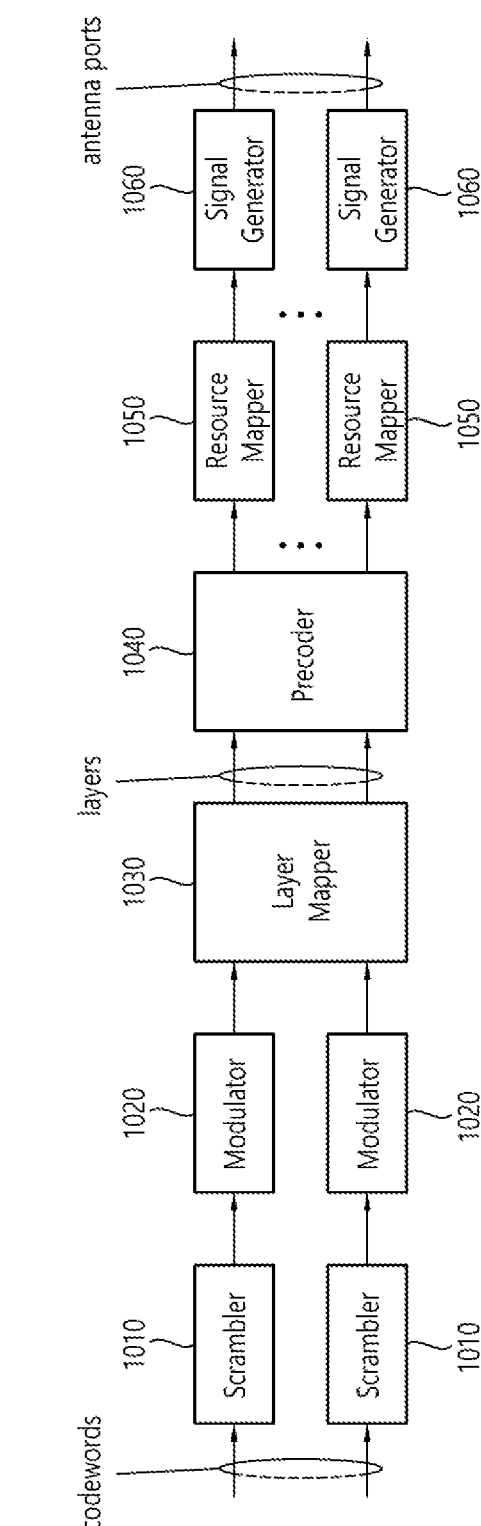
FIG. 21 shows a signal process circuit for a transmission signal, based on an embodiment of the present disclosure.

FIG. 21 shows a signal process circuit for a transmission signal, based on an embodiment of the present disclosure.

Referring to FIG. 21, a signal processing circuit 1000 may include scramblers 1010, modulators 1020, a layer mapper 1030, a precoder 1040, resource mappers 1050, and signal generators 1060. An operation/function of FIG. 21 may be performed, without being limited to, the processors 102 and 202 and/or the transceivers 106 and 206 of FIG. 20. Hardware elements of FIG. 21 may be implemented by the processors 102 and 202 and/or the transceivers 106 and 206 of FIG. 20. For example, blocks 1010 to 1060 may be implemented by the processors 102 and 202 of FIG. 20. Alternatively, the blocks 1010 to 1050 may be implemented by the processors 102 and 202 of FIG. 20 and the block 1060 may be implemented by the transceivers 106 and 206 of FIG. 20.

Codewords may be converted into radio signals via the signal processing circuit 1000 of FIG. 21. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 21. For example, the wireless devices (e.g., 100 and 200 of FIG. 20) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

FIG. 22 shows another example of a wireless device, based on an embodiment of the present disclosure. The wireless device may be implemented in various forms according to a use-case/service (refer to FIG. 19).

Referring to FIG. 22, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Figure 23:
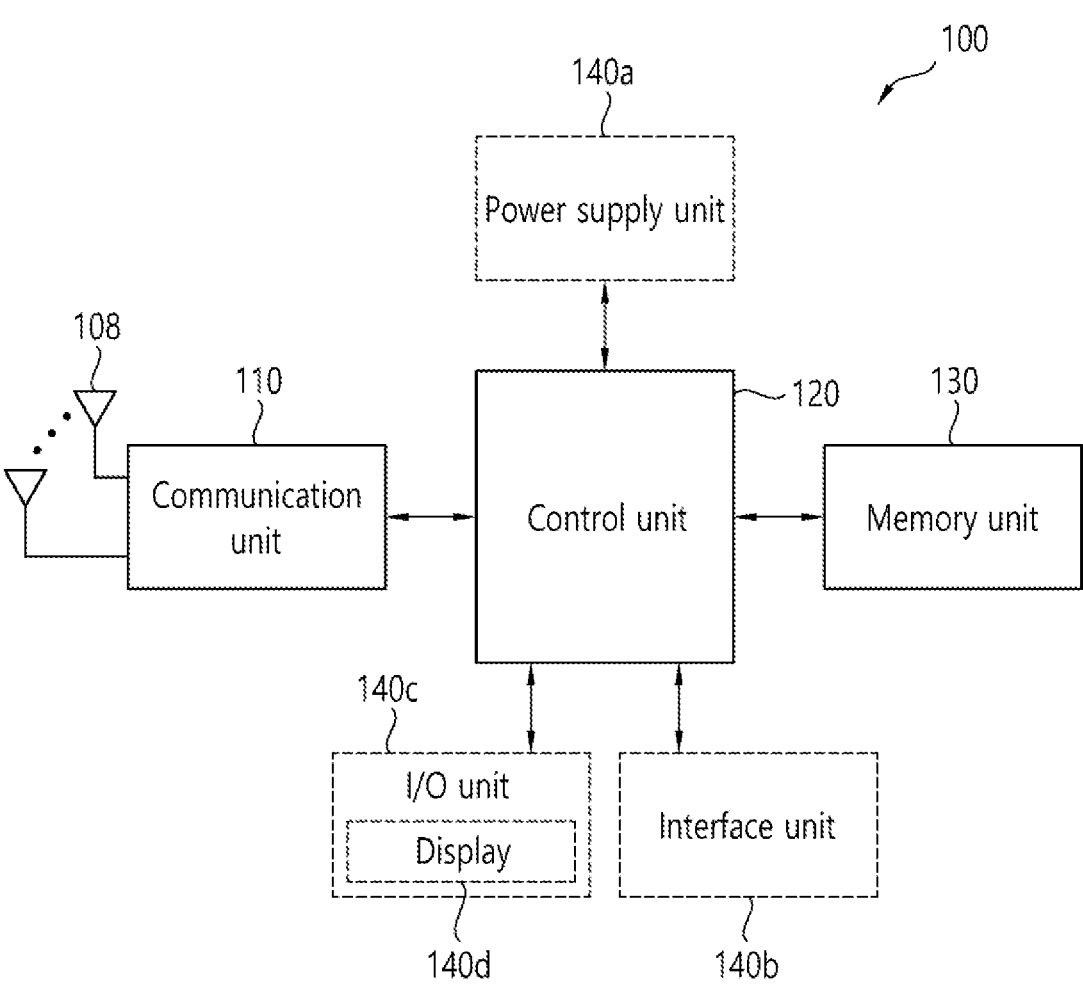
FIG. 23 shows a hand-held device, based on an embodiment of the present disclosure.

FIG. 23 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 23, a hand-held device 100 may include an antenna unit 108, a communication unit 110, a control unit 120, a memory 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 22, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/ signals. The restored information/signals may be stored in the memory unit 130 and may be output as various types (e.g., text, voice, images, video, or haptic) through the I/O unit 140c.

FIG. 24 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 24, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method, by a first device, comprising:
 receiving, from a second device, information related to a latency bound related to sidelink channel state information;
 triggering a resource selection, based on a resource not being within the latency bound;
 selecting at least one resource, based on the latency bound related to the sidelink channel state information;
 obtaining a medium access control (MAC) protocol data unit (PDU) including a medium access control (MAC) control element (CE) for reporting the sidelink channel state information; and
 transmitting, to the second device, the MAC PDU based on the at least one resource,
 wherein sidelink hybrid automatic repeat request (HARQ) feedback related to the transmission of the MAC PDU is disabled, based on the MAC PDU including only the MAC CE for reporting the sidelink channel state information.

2. The method of claim 1, further comprising
 receiving, from the second device, sidelink control information (SCI) including information requesting to report the sidelink channel state information,
 wherein reporting of the sidelink channel state information is triggered based on the SCI including the information requesting to report the sidelink channel state information.

3. The method of claim 1, further comprising:
 establishing a PC5 radio resource control (RRC) connection with the second device,
 wherein the information related to the latency bound related to the sidelink channel state information is received from the second device through PC5 RRC signaling.

4. The method of claim 2, wherein a timer related to the latency bound is started based on the SCI including the information requesting to report the sidelink channel state information.

5. The method of claim 1, further comprising:
 checking whether the resource is within the latency bound,
 wherein, based on a result of the checking that the resource is not within the latency bound, the resource selection is triggered.

6. The method of claim 2, wherein the reporting of the sidelink channel state information is aperiodic.

7. The method of claim 1, wherein the reselected at least one resource satisfies a requirement related to pre-configured sidelink channel state information, and
 wherein the requirement related to the pre-configured sidelink channel state information includes at least one of a priority, a latency, a reliability, or a minimum required communication range.

8. The method of claim 1, wherein the at least one resource satisfies a requirement related to the sidelink channel state information among at least one of a time interval related to the at least one resource, a size of a frequency domain related to the at least one resource, a number of retransmission resources related to the at least one resource, a number of retransmissions related to the at least one resource, whether operation of sidelink HARQ feedback is supported, a sidelink HARQ feedback type, a transmission power related to the at least one resource, or a coding rate value related to the at least one resource.

9. The method of claim 1, wherein the at least one resource is less than a pre-configured threshold related to a coding rate for transmitting the MAC PDU on the at least one resource.

10. The method of claim 1, wherein, in a logical channel priority (LCP) procedure, a priority of the MAC CE for reporting the sidelink channel state information is higher than a priority of data related to traffic.

11. A first device comprising:

one or more transceivers; and one or more processors; and one or more memories connected to the one or more processors and the one or more transceivers and storing instructions that, based on being executed by the one or more processors, cause the first device to perform operations comprising:

receiving, from a second device, information related to a latency bound related to sidelink channel state information;

triggering a resource reselection, based on a resource not being within the latency bound;

selecting at least one resource, based on the latency bound related to the sidelink channel state information;

obtaining a medium access control (MAC) protocol data unit (PDU) including a medium access control (MAC) control element (CE) for reporting the sidelink channel state information; and transmitting, to the second device, the MAC PDU based on the at least one resource, wherein sidelink hybrid automatic repeat request (HARQ) feedback related to the transmission of the MAC PDU is disabled, based on the MAC PDU including only the MAC CE for reporting the sidelink channel state information.

12. The first device of claim 11, wherein the operations further comprise:

receiving, from the second device, sidelink control information (SCI) including information requesting to report the sidelink channel state information, wherein reporting of the sidelink channel state information is triggered based on the SCI including the information requesting to report the sidelink channel state information.

13. The first device of claim 11, further comprising:

establishing a PC5 radio resource control (RRC) connection with the second device, wherein the information related to the latency bound related to the sidelink channel state information is received from the second device through PC5 RRC signaling.

14. The first device of claim 12, wherein a timer related to the latency bound is started based on the SCI including the information requesting to report the sidelink channel state information.

15. The first device of claim 11, further comprising:

checking whether the resource is within the latency bound, wherein, based on a result of the checking that the resource is not within the latency bound, the resource selection is triggered.

16. The first device of claim 12, wherein the reporting of the sidelink channel state information is aperiodic.

17. An apparatus adapted to control a first device, the apparatus comprising:

one or more processors; and one or more memories operably connected to the one or more processors and storing instructions, based on being executed by the one or more processors, cause the first device to perform operations comprising:

receiving, from a second device, information related to a latency bound related to sidelink channel state information;

triggering a resource reselection, based on a resource not being within the latency bound;

selecting at least one resource, based on the latency bound related to the sidelink channel state information;

obtaining a medium access control (MAC) protocol data unit (PDU) including a medium access control (MAC) control element (CE) for reporting the sidelink channel state information; and transmitting, to the second device, the MAC PDU based on the at least one resource, wherein sidelink hybrid automatic repeat request (HARQ) feedback related to the transmission of the MAC PDU is disabled, based on the MAC PDU including only the MAC CE for reporting the sidelink channel state information.

* * * * *